US011643506B2

(12) United States Patent
Lu et al.

(10) Patent No.: US 11,643,506 B2
(45) Date of Patent: May 9, 2023

(54) POLYFUNCTIONAL ORGANOSILOXANES, COMPOSITIONS CONTAINING SAME, AND METHODS FOR THE PREPARATION THEREOF

(71) Applicant: Dow Silicones Corporation, Midland, MI (US)

(72) Inventors: Gang Lu, Freeport, TX (US); Nanguo Liu, Midland, MI (US); Zhenbin Niu, Midland, MI (US); David Rich, Midland, MI (US); Michael Telgenhoff, Midland, MI (US); Michael Wang, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 101 days.

(21) Appl. No.: 17/277,593

(22) PCT Filed: Dec. 4, 2019

(86) PCT No.: PCT/US2019/064347
§ 371 (c)(1),
(2) Date: Mar. 18, 2021

(87) PCT Pub. No.: WO2020/131366
PCT Pub. Date: Jun. 25, 2020

(65) Prior Publication Data
US 2022/0033589 A1    Feb. 3, 2022

Related U.S. Application Data

(60) Provisional application No. 62/783,225, filed on Dec. 21, 2018.

(51) Int. Cl.
| | |
|---|---|
| *C08G 77/50* | (2006.01) |
| *C08G 77/08* | (2006.01) |
| *C09J 183/14* | (2006.01) |
| *C09D 183/14* | (2006.01) |
| *C08G 77/12* | (2006.01) |
| *C08L 83/14* | (2006.01) |

(52) U.S. Cl.
CPC ............ *C08G 77/50* (2013.01); *C08G 77/08* (2013.01); *C08G 77/12* (2013.01); *C08L 83/14* (2013.01); *C09D 183/14* (2013.01); *C09J 183/14* (2013.01)

(58) Field of Classification Search
CPC ................................. C08G 77/08; C08G 77/12
See application file for complete search history.

(56) References Cited

U.S. PATENT DOCUMENTS

| | | | |
|---|---|---|---|
| 3,159,601 A | 12/1964 | Ashby | |
| 3,175,993 A | 3/1965 | Weyenberg | |
| 3,220,972 A | 11/1965 | Lamoreaux | |
| 3,296,291 A | 1/1967 | Chalk et al. | |
| 3,419,593 A | 12/1968 | Willing | |
| 3,516,946 A | 7/1970 | Modic | |
| 3,814,730 A | 6/1974 | Karstedt | |
| 3,989,668 A | 11/1976 | Lee et al. | |
| 4,374,967 A | 2/1983 | Brown et al. | |
| 4,766,176 A | 8/1988 | Lee et al. | |
| 4,784,879 A | 11/1988 | Lee et al. | |
| 5,017,654 A | 5/1991 | Togashi et al. | |
| 5,036,117 A | 7/1991 | Chung et al. | |
| 5,175,325 A | 12/1992 | Brown et al. | |
| 5,340,899 A * | 8/1994 | Altes ..................... | C08G 77/50 524/789 |
| 5,422,412 A | 6/1995 | Morita et al. | |
| 5,536,803 A | 7/1996 | Fujiki et al. | |
| 5,581,008 A | 12/1996 | Kobayashi | |
| 5,625,023 A | 4/1997 | Chung et al. | |
| 6,127,502 A | 10/2000 | Krahnke et al. | |
| 6,169,156 B1 | 1/2001 | Yoshitake | |
| 6,175,031 B1 | 1/2001 | Tachikawa | |
| 6,235,832 B1 | 5/2001 | Deng et al. | |
| 6,239,246 B1 | 5/2001 | Takahashi et al. | |
| 6,265,518 B1 | 7/2001 | Krahnke et al. | |
| 6,586,535 B1 | 7/2003 | Clark et al. | |
| 6,753,438 B2 | 6/2004 | Taylor et al. | |
| 6,806,339 B2 | 10/2004 | Cray et al. | |
| 7,064,173 B2 | 6/2006 | Rubinsztajn et al. | |
| 7,148,370 B1 | 12/2006 | Rubinsztajn et al. | |
| 7,378,482 B2 | 5/2008 | Asch et al. | |
| 7,429,636 B2 | 9/2008 | Asch et al. | |
| 7,432,338 B2 | 10/2008 | Chapman et al. | |
| 7,449,536 B2 | 11/2008 | Chapman et al. | |

(Continued)

FOREIGN PATENT DOCUMENTS

| | | |
|---|---|---|
| EP | 0347895 | 12/1989 |
| EP | 0556023 | 8/1993 |

(Continued)

OTHER PUBLICATIONS

Grand, et al., "Anhydrous formation of foamed silicone elastomers using the PiersRubinsztajn reaction", Polymer, vol. 53, No. 15, May 20, 2012, pp. 3135-3142.
Grand, et al., "Testing the Functional Tolerance of the Piers-Rubinsztajn Reaction: A New Strategy for Funtional Silicones", The Royal Society of Chemistry 2010, 48 pages.
Rubinsztajn, et al., "A New Polycondensation Process for the Preparation of Polysiloxane Copolymers", Macromolecules, 2005, vol. 38, Sep. 30, 2004, pp. 1061-1063.
Thompson, et al., "Rapid Assembly of Complex 3D Siloxane Architectures", JACS Communications, vol. 130, No. 1, Oct. 12, 2007, pp. 32-33.

(Continued)

*Primary Examiner* — Marc S Zimmer
(74) *Attorney, Agent, or Firm* — Catherine U. Brown

(57) ABSTRACT

Polyorganosiloxanes and methods for their preparation are disclosed. The polyorganosiloxanes are useful in curable compositions. The polyorganosiloxanes may have up to 9 silicon bonded hydrogen atoms, or other curable groups, per molecule.

25 Claims, No Drawings

(56) References Cited

U.S. PATENT DOCUMENTS

| | | | |
|---|---|---|---|
| 7,642,332 | B2 | 1/2010 | Kennedy et al. |
| 7,687,591 | B2 | 3/2010 | Bhagwagar et al. |
| 7,906,605 | B2 | 3/2011 | Cray et al. |
| 7,999,053 | B2 | 8/2011 | Sutton et al. |
| 8,304,543 | B2 | 11/2012 | Jialanella et al. |
| 8,422,317 | B2 | 4/2013 | Kamp et al. |
| 8,722,153 | B2 | 5/2014 | Ekeland |
| 8,933,177 | B2 | 1/2015 | Hori et al. |
| 9,093,625 | B2 | 7/2015 | Koshikawa et al. |
| 9,156,948 | B2 | 10/2015 | Brandstadt et al. |
| 9,334,294 | B2 | 5/2016 | Liu |
| 9,388,284 | B2 | 7/2016 | Liu et al. |
| 9,422,317 | B2 | 8/2016 | Liu et al. |
| 9,518,073 | B2 | 12/2016 | Liu et al. |
| 9,530,946 | B2 | 12/2016 | Liu et al. |
| 9,562,149 | B2 | 2/2017 | Cray et al. |
| 9,593,209 | B2 | 3/2017 | Dent et al. |
| 9,670,392 | B2 | 6/2017 | Larson et al. |
| 9,718,925 | B2 | 8/2017 | Jiang et al. |
| 9,718,927 | B2 | 8/2017 | Liu et al. |
| 9,862,867 | B2 | 1/2018 | Gordon et al. |
| 9,944,758 | B2 | 4/2018 | Jiang et al. |
| 10,138,258 | B2 | 11/2018 | Christiano et al. |
| 2003/0088042 | A1 | 5/2003 | Griswold et al. |
| 2003/0139287 | A1 | 7/2003 | Deforth et al. |
| 2004/0127668 | A1 | 7/2004 | Rubinsztajn et al. |
| 2004/0254274 | A1 | 12/2004 | Griswold |
| 2005/0038188 | A1 | 2/2005 | Ahn et al. |
| 2005/0206680 | A1 | 9/2005 | Chen et al. |
| 2005/0256286 | A1 | 11/2005 | Asch et al. |
| 2006/0189767 | A1 | 8/2006 | Bhagwagar et al. |
| 2007/0289495 | A1 | 12/2007 | Cray et al. |
| 2009/0137764 | A1 | 5/2009 | Sutton et al. |
| 2011/0287267 | A1 | 11/2011 | Hori et al. |
| 2013/0320392 | A1 | 12/2013 | Koshikawa et al. |
| 2014/0187733 | A1 | 7/2014 | Okawa et al. |
| 2014/0306259 | A1 | 10/2014 | Liu et al. |
| 2014/0309380 | A1 | 10/2014 | Liu et al. |
| 2014/0309449 | A1 | 10/2014 | Liu et al. |
| 2014/0309450 | A1 | 10/2014 | Liu |
| 2016/0002513 | A1 | 1/2016 | Gordon et al. |
| 2016/0009865 | A1 | 1/2016 | Jiang et al. |
| 2016/0032060 | A1 | 2/2016 | Jiang et al. |
| 2016/0053056 | A1 | 2/2016 | Gould et al. |
| 2016/0289390 | A1 | 10/2016 | Liu et al. |
| 2017/0029571 | A1 | 2/2017 | Kusunoki et al. |
| 2017/0145148 | A1 | 5/2017 | Christiano et al. |
| 2017/0335064 | A1 | 11/2017 | Stapleton et al. |
| 2020/0010734 | A1 | 1/2020 | Dash et al. |
| 2020/0140618 | A1 | 5/2020 | Gohndrone et al. |
| 2020/0208033 | A1 | 7/2020 | Lu et al. |
| 2020/0231755 | A1 | 7/2020 | Gohndrone et al. |
| 2020/0231756 | A1 | 7/2020 | Gohndrone et al. |
| 2020/0325371 | A1 | 10/2020 | Dash et al. |

FOREIGN PATENT DOCUMENTS

| | | |
|---|---|---|
| WO | 2002081551 | 10/2002 |
| WO | WO 2005/118682 A1 * | 12/2005 |
| WO | 2009088472 | 7/2009 |
| WO | 2013142956 | 10/2013 |
| WO | 2014059132 | 4/2014 |
| WO | 2020131365 | 6/2020 |
| WO | 2020131367 | 6/2020 |
| WO | 2020131369 | 6/2020 |

OTHER PUBLICATIONS

Wang, J., et al., "A New Flourinated Polysiloxane with Good Optical Properties and Low Dielectric Constant at High Frequency Based on Easily Available Tetraethoxysilane (TEOS)", Macromolecules, vol. 50, No. 23, Dec. 12, 2017, pp. 9343-9402.

Yoshikawa, et al., "Polymerization of Cyclododecasiloxanes with Si-H and Si-OEt Side Groups by the Piers-Rubinsztajn Reaction", Bulletin of the Chemical Society of Japan, vol. 91, No. 5, May 15, 2018, pp. 747-753.

* cited by examiner

POLYFUNCTIONAL ORGANOSILOXANES, COMPOSITIONS CONTAINING SAME, AND METHODS FOR THE PREPARATION THEREOF

CROSS-REFERENCE TO RELATED APPLICATIONS

This application is a U.S. national stage filing under 35 U.S.C. § 371 of PCT Application No. PCT/US19/064347 filed on 4 Dec. 2019, which claims the benefit of U.S. Provisional Patent Application No. 62/783,225 filed 21 Dec. 2018 under 35 U.S.C. § 119 (e). PCT Application No. PCT/US19/064347 and U.S. Provisional Patent Application No. 62/783,225 are hereby incorporated by reference.

TECHNICAL FIELD

A polyfunctional organosiloxane and method for its preparation is disclosed. The polyfunctional organosiloxane comprises a linear polydiorganosiloxane backbone with branched siloxane endblockers. The polyfunctional organosiloxane is useful in curable compositions, e.g., as a crosslinker.

BACKGROUND

Methods for making polyfunctional organosiloxane crosslinkers having linear polydiorganosiloxane backbones with branched siloxane endblockers have been proposed using platinum catalyzed reaction of branched organohydrogensiloxanes with vinyl terminated polydiorganosiloxanes. These polyfunctional organosiloxane crosslinkers have branched siloxane endblockers bonded to the linear polydiorganosiloxane backbone via divalent hydrocarbon linkers. These methods may suffer from the drawbacks of producing crosslinked products, with poor ability to control structure, molecular weight and degree of crosslinking in the products. Furthermore, the polyfunctional organosiloxane crosslinkers produced as described above have limitations on the amount of silicon bonded functional substituents. These crosslinkers have no more than 3 silicon bonded functional substituents (e.g., silicon bonded hydrogen atoms, silicon bonded curable groups, or a combination thereof) at each terminus.

SUMMARY

A polyfunctional organohydrogensiloxane and method for its preparation using a boron containing Lewis acid as catalyst is described herein. A clustered functional organosiloxane may be prepared by a method comprising functionalizing the polyfunctional organohydrogensiloxane. The polyfunctional organohydrogensiloxane and the clustered functional organosiloxane are useful in curable compositions. The polyfunctional organohydrogensiloxane may be used in a release coating composition. The clustered functional organosiloxane may be used in an adhesive composition.

DETAILED DESCRIPTION OF THE INVENTION

The polyfunctional organohydrogensiloxane prepared by the method described herein comprises a linear polydiorganosiloxane backbone with branched siloxane endblockers. The branched siloxane endblockers are linked to the linear polydiorganosiloxane backbone via oxygen linkers. The polyfunctional organohydrogensiloxane may be used as an additive in a curable composition, such as a release coating composition.

The polyfunctional organohydrogensiloxane may be prepared by a method comprising the steps of:

1) combining starting materials comprising

A) a boron containing Lewis acid;

B) an alkoxysilyl terminated polydiorganosiloxane of formula:

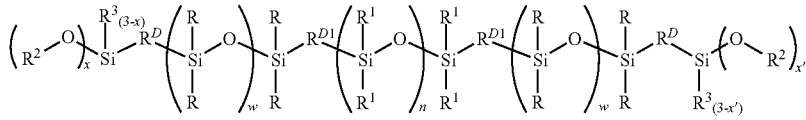

where each subscript x is independently 1, 2, or 3;
each subscript x' is independently 1, 2, or 3;
a quantity (x+x')=2 to 6;
each subscript w is independently 1 to 10;
each subscript n is 1 to 2,000;
each R is an independently selected monovalent hydrocarbon group;
each $R^1$ is independently selected from the group consisting of monovalent hydrocarbon groups and monovalent halogenated hydrocarbon groups;
each $R^2$ is an independently selected alkyl group of 1 to 6 carbon atoms;
each $R^3$ is independently selected from the group consisting of monovalent hydrocarbon groups and monovalent halogenated hydrocarbon groups;
each $R^D$ is a divalent hydrocarbon group; and
each $R^{D1}$ is independently selected from the group consisting of an oxygen atom and a divalent hydrocarbon group; and C) a branched organohydrogensiloxane of formula:

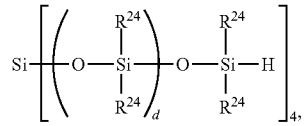

where each subscript d is independently 0 to 995 and each $R^{24}$ is an independently selected monovalent hydrocarbon group, thereby preparing the product, where the product comprises a polyfunctional organohydrogensiloxane and a by-product comprising $HR^2$. The starting materials in step 1) may optionally further comprise D) a solvent.

The method may optionally further comprise one or more additional steps. The method may further comprise recovering the polyfunctional organohydrogensiloxane. The method may further comprise: 2) during and/or after step 1), removing the HR² generated during formation of the polyfunctional organohydrogensiloxane and/or 3) neutralizing residual boron containing Lewis acid in the product. By-product HR² may be removed by any convenient means, such as stripping, liquefying, and/or burning. Neutralizing may be performed by adding E) a neutralizing agent to the product and thereafter filtering the product. Steps 2) and 3) may be performed in any order. If a particulate by-product is present, e.g., as a result of neutralization, the method may further comprise 4) removing particulate by-product by any convenient means, such as filtration. Step 2) may be performed before or after step 3).

One or more of the method steps may be performed at a temperature of 5° C. to 70° C., alternatively 5° C. to 65° C., alternatively 10° C. to 60° C., alternatively 15° C. to 50° C., alternatively 20° C. to 35° C., alternatively 5° C. to 30° C., and alternatively 30° C. Alternatively, step 1) may be performed at the temperature of 5° C. to 70° C., alternatively 5° C. to 65° C., alternatively 10° C. to 60° C., alternatively 15° C. to 50° C., alternatively 20° C. to 35° C., alternatively 5° C. to 30° C., and alternatively 30° C. Without wishing to be bound by theory, it is thought that performing the method, particularly step 1) at relatively low temperatures (e.g., 90° C. or less, alternatively 80° C. or less, alternatively 70° C. or less, and alternatively 50° C. or less) may provide improved reaction rate, yield, or both.

Alternatively, step 1) may be performed by a method comprising:
1a) combining starting materials comprising
A) the boron—containing Lewis acid, and
B) the alkoxysilyl terminated polydiorganosiloxane, thereby forming a catalyzed mixture; and thereafter
1b) adding the catalyzed mixture into a starting material comprising
C) the organohydrogensiloxane, thereby preparing the product comprising the functionalized polyorganosiloxane and the by-product comprising a compound of formula HR². The starting materials in step 1a) are free of SiH functional organosilicon compounds such as starting material C). The starting materials in step 1b) may be free of alkoxysilyl functional organosilicon compounds, such as starting material B), before beginning the addition of the catalyzed mixture. "Free of" as used herein includes none, alternatively an amount non-detectable by GC, and alternatively an amount insufficient to deactivate A) the boron—containing Lewis acid used as catalyst for reacting starting materials B) and C). The starting materials used in steps 1a) and/or 1b) of this method may optionally further comprise D) the solvent. One or more of starting materials A), B) and C) may be dissolved in the solvent before adding in the method.

This method may optionally further comprise adding additional boron—containing Lewis acid, to C) the organohydrogensiloxane before adding the catalyzed mixture to the organohydrogensiloxane in step 1b). The additional boron containing Lewis acid may be present in an amount of 5 ppm to 250 ppm based on weight of C) the organohydrogensiloxane.

In steps 1a) and 1b) of this method, the boron containing Lewis acid, and when present, and any additional boron containing Lewis acid, may be provided in a total amount of 50 ppm to 6000 ppm (alternatively 50 to 600 ppm), based on combined weights of the organosilicon compound and the organohydrogensiloxane. The Lewis acid in step 1a) and the additional Lewis acid, when used in step 1b), may be the same or different Lewis acids, as described above for starting material A). Alternatively, in step 1a), the boron containing Lewis acid may be present in an amount of 5 ppm to 600 ppm (alternatively 15 ppm to 600 ppm and alternatively 15 ppm to 250 ppm) based on weight of B) the alkoxysilyl terminated polydiorganosiloxane.

The method described herein may be performed at relatively low temperatures. Step 1a) and/or 1b) may be performed at a temperature of 5° C. to 70° C., alternatively 5° C. to 65° C., alternatively 10° C. to 60° C., alternatively 15° C. to 50° C., alternatively 20° C. to 35° C., alternatively 5° C. to 30° C., and alternatively 30° C. Steps 1a) and 1b) may be performed at the same temperature or different temperatures. Alternatively, the catalyzed mixture in step 1a) may be heated to 40° C. to 70° C. before step 1b). Alternatively, after heating to 40° C. to 70° C., the catalyzed mixture may be cooled to less than 40° C. in step 1b). Alternatively, step 1b) may be performed at a temperature of 5° C. to 40° C. Alternatively, steps 1a) and 1b) of the method may be performed at a temperature of 10° C. to <25° C.

The starting materials used in step 1) of the method, alternatively steps 1), 2), and 3) of the method, may be free of platinum group metal catalysts. "Free of" as used herein includes none, alternatively an amount non-detectable by GC, and alternatively an amount insufficient to cause performance problems of release coatings prepared from release coating compositions including the polyfunctional organohydrogensiloxane made by the method described herein.

Starting Material A) Catalyst

Starting material A) in the method described herein is a boron containing Lewis acid. The boron containing Lewis acid may be a trivalent boron compound with at least one perfluoroaryl group per molecule, alternatively 1 to 3 perfluoroaryl groups per molecule, alternatively 2 to 3 perfluoroaryl groups per molecule, and alternatively 3 perfluoroaryl groups per molecule. The perfluoroaryl groups may have 6 to 12 carbon atoms, alternatively 6 to 10 carbon atoms, and alternatively 6 carbon atoms. The A) the boron containing Lewis Acid catalyst may be selected from the group consisting of $(C_5F_4)(C_6F_5)_2B$; $(C_5F_4)_3B$; $(C_6F_5)BF_2$; $BF(C_6F_5)_2$; $B(C_6F_5)_3$; $BCl_2(C_6F_5)$; $BCl(C_6F_5)_2$; $B(C_6H_5)(C_6F_5)_2$; $B(C_6H_5)_2(C_6F_5)$; $[C_6H_4(mCF_3)]_3B$; $[C_6H_4(pOCF_3)]_3B$; $(C_6F_5)B(OH)_2$; $(C_6F_5)_2BOH$; $(C_6F_5)_2BH$; $(C_6F_5)BH_2$; $(C_7H_{11})B(C_6F_5)_2$; $(C_8H_{14})B(C_6F_5)$; $(C_6F_5)_2B(OC_2H_5)$; or $(C_6F_5)_2B—CH_2CH_2Si(CH_3)$. Alternatively, the boron containing Lewis acid catalyst may be tris(pentafluorophenyl)borane of formula $B(C_6F_5)_3$. Such boron containing Lewis acids are commercially available from, e.g., Millipore Sigma of St. Louis, Mo., USA. The amount of starting material A) will depend on the type and amount of other starting materials used, however, starting material A) may be present in an amount of 50 ppm to 6000 ppm based on combined weights of starting materials A), B) and C). Alternatively, the amount may be 50 ppm to 600 ppm on the same basis.

Starting Material B) Alkoxy Terminated Polydiorganosiloxane

Starting material B) is an alkoxysilyl terminated polydiorganosiloxane of formula B-1):

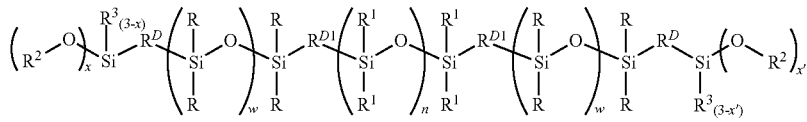

In formula B-1), subscript x may be 1, 2, or 3. Alternatively, subscript x may be 2 or 3, alternatively 3. Subscript x' may be 1, 2, or 3. Alternatively, subscript x' may be 2 or 3, alternatively 3. Alternatively, the quantity (x+x') may be 2 to 6, alternatively 3 to 6, alternatively 4 to 6, and alternatively 6.

In formula B-1), each subscript w is independently at least 1, alternatively 1 to 10. Alternatively 1 to 5, alternatively 1 to 4, alternatively 1 to 3, and alternatively 1 to 2. Alternatively, w=2.

In formula B-1), subscript n may be 1 to 2,000. Alternatively, subscript n may be 1 to 1,000, alternatively 5 to 900, alternatively 5 to 50, and alternatively 5 to 15.

In formula B-1), each R is an independently selected monovalent hydrocarbon group. Alternatively, each R may be an alkyl group of 1 to 6 carbon atoms. Alternatively, R may be methyl, ethyl, or propyl. Alternatively, each R may be methyl.

In formula B-1), each $R^1$ is independently selected from the group consisting of monovalent hydrocarbon groups and monovalent halogenated hydrocarbon groups. Alternatively, each $R^1$ may be independently selected from the group consisting of an alkyl group of 1 to 20 carbon atoms, an alkenyl group of 2 to 20 carbon atoms, an aryl group of 6 to 20 carbon atoms, or a halogenated alkyl group of 1 to 20 carbon atoms. Suitable alkyl groups include methyl, ethyl, and propyl (including n-propyl and isopropyl). Suitable alkenyl groups include vinyl, allyl, and hexenyl. Suitable aryl groups include phenyl. Suitable halogenated alkyl groups include chloromethyl, chloropropyl, and trifluoropropyl. Alternatively, each $R^1$ may be independently selected from the group consisting of methyl, vinyl, phenyl, and trifluoropropyl.

In formula B-1), each $R^2$ is an independently selected alkyl group of 1 to 6 carbon atoms. Alternatively, $R^2$ may be methyl, ethyl, or propyl (including n-propyl and isopropyl). Alternatively, each $R^2$ may be methyl.

In formula B-1), each $R^3$ is independently selected from the group consisting of monovalent hydrocarbon groups and monovalent halogenated hydrocarbon groups, such as those described above for $R^1$. Alternatively, each $R^3$ may be methyl, ethyl, or propyl (including n-propyl and isopropyl). Alternatively, each $R^3$ may be methyl.

In formula B-1), each $R^D$ is a divalent hydrocarbon group. Each $R^D$ may be exemplified by an alkylene group such as ethylene, propylene, butylene, or hexylene; an arylene group such as phenylene, or an alkylarylene group such as:

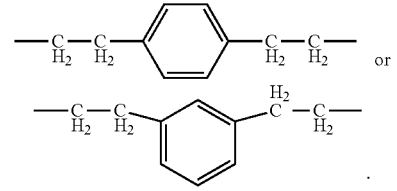

Alternatively, each $R^D$ may be an alkylene group such as ethylene or propylene; alternatively ethylene.

In formula B-1), each $R^{D1}$ is independently selected from the group consisting of an oxygen atom and a divalent hydrocarbon group, such as that described above for $R^D$.

Alternatively, the alkoxysilyl terminated polydiorganosiloxane may have the formula above, where each $R^{D1}$ is a divalent hydrocarbon group. Such alkoxysilyl terminated polydiorganosiloxanes may be prepared by known methods such as that described in U.S. Pat. No. 5,403,881, which is hereby incorporated by reference. Methods include hydrosilylation reaction of a polydiorganosiloxane terminated with aliphatically unsaturated groups (e.g., alkenyl such as vinyl, allyl, or hexenyl or alkynyl such as ethynyl or propynyl) and alkoxy-functional organohydrogensiloxane oligomers. Examples of such alkoxy-functional organohydrogensiloxane oligomers may be prepared by the methods in U.S. Pat. No. 3,175,993 to Weyenberg and co-pending U.S. Provisional Patent Application Ser. Nos. 62/524,636, 62/524,637, and 62/524,639, all of which were filed on 26 Jun. 2017, and all of which are hereby incorporated by reference.

Alternatively, starting material B) may be a trialkoxy-terminated polydiorganosiloxane of formula B-2):

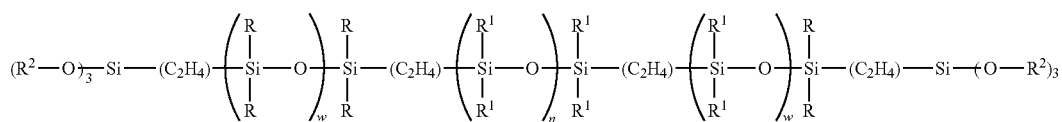

where subscript w and subscript n, and R, $R^1$, are $R^2$ are as described above.

Alternatively, starting material B) may be a polydiorganosiloxane of formula B-3): $R^3{}_2R^X SiO-(R^3{}_2 SiO)_b-OSiR^X R^3{}_2$, where subscript b≥1, $R^X$ represents a group of the formula $-OR^2$ as described above, and each $R^3$ is an independently selected monovalent hydrocarbon group as described hereinbelow. Suitable monovalent hydrocarbon groups for $R^3$ are exemplified by alkyl, alkenyl, and aryl as described hereinbelow. Suitable halogenated hydrocarbon groups for $R^3$ are exemplified by haloalkyl, as described hereinbelow. Alternatively, alkyl groups may be selected from the group consisting of methyl, ethyl, and propyl. Alternatively, alkenyl groups may be selected from the group consisting of vinyl, allyl, and hexenyl. Alternatively, aryl groups may be phenyl. Alternatively, haloalkyl groups may be selected from the group consisting of chloromethyl, chloropropyl, and trifluoropropyl.

Alternatively, in formula B-3), subscript b may be 1 to 2,000 and alternatively subscript b may be 1 to 50.

Alternatively, in formula B-3), each $R^3$ may be independently selected from the group consisting of alkyl (e.g., methyl, ethyl, and propyl), alkenyl (e.g., vinyl, allyl, and hexenyl), aryl (e.g., phenyl), and haloalkyl (e.g., chloromethyl, chloropropyl, and trifluoropropyl). Alternatively, in formula B-3), each $R^X$ may be methoxy or ethoxy, and alternatively each $R^X$ may be methoxy. Polydiorganosiloxanes of formula B-3), such as methoxy terminated polydimethylsiloxane with viscosity of 5 to 12 cSt are commercially available from Gelest, Inc. and 1,3-diethoxy-1,1,3,3-tetramethyldisiloxane is commercially available from Millipore Sigma.

The amount of starting material B) depends on various factors including the amount of starting material A), the number of alkoxy groups of formula —$OR^2$ per molecule of starting material B), and the order of addition selected. However, the total amount of starting materials B) and C) may be selected such that a molar ratio of silicon bonded hydrogen atoms in starting material C) to —$OR^2$ groups in starting material B) (SiH:alkoxy ratio) is 5:1 to 40:1, alternatively 10:1 to 30:1, and alternatively 20:1 to 30:1.

Starting Material C) Branched Organohydrogensiloxane

Starting material C) used in the method is a branched polyorganohydrogensiloxane of formula C-1): a polyorganohydrogensiloxane of formula

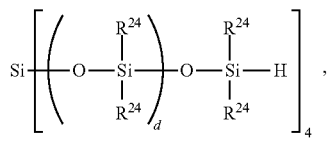

where each subscript d is independently 0 to 995, and each $R^{24}$ is an independently selected monovalent hydrocarbon group, as described above. Alternatively, each $R^{24}$ may be independently selected from the group consisting of an alkyl group of 1 to 20 carbon atoms, an alkenyl group of 2 to 20 carbon atoms, or an aryl group of 6 to 20 carbon atoms. Suitable alkyl groups include methyl, ethyl, and propyl (including n-propyl and isopropyl). Suitable alkenyl groups include vinyl, allyl, and hexenyl. Suitable aryl groups include phenyl. Alternatively, each $R^{24}$ may be independently selected from the group consisting of methyl, vinyl, and phenyl; alternatively, each $R^{24}$ may be methyl or phenyl. Alternatively, each $R^{24}$ may be methyl. When the branched polyorganohydrogensiloxane contains difunctional siloxy units, i.e., of formula $(R^{24}{}_2SiO_{2/2})_d$, each subscript d may be independently 15 to 995, alternatively each subscript d may be independently 15 to 100. Alternatively, each subscript d may be independently 0 to 50.

Alternatively, when each subscript d=0, the branched polyorganohydrogensiloxane may have formula C-2):

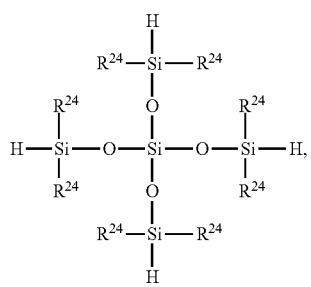

where $R^{24}$ is as described above. Suitable branched polyorganohydrogensiloxanes such as tetrakis(dimethylsiloxy)silane are known in the art and are commercially available from Gelest, Inc. of Morrisville, Pa., USA or Millipore Sigma of St. Louis, Mo., USA. Suitable branched polyorganohydrogensiloxanes may be prepared by known methods, such as cohydrolysis of tetrahalosilane with monohalosilane, optionally with dihalosilane or cohydrolysis of tetraalkoxysilane with monoalkoxysilane, optionally with dialkoxysilane. Suitable branched polyorganohydrogensiloxanes and method for their preparation methods are disclosed, for example, in U.S. Pat. Nos. 5,422,412 and 5,581,008.

Starting Material D) Solvent

A solvent may be used in the method. The solvent may facilitate introduction of certain starting materials, such as starting material A) the boron containing Lewis acid. Solvents used herein are those that help fluidize the starting materials but essentially do not react with any of these starting materials. Solvent may be selected based on solubility the starting materials and volatility of the solvent. The solubility refers to the solvent being sufficient to dissolve and/or disperse the starting materials. Volatility refers to vapor pressure of the solvent.

Suitable solvents may be hydrocarbons. Suitable hydrocarbons include aromatic hydrocarbons such as benzene, toluene, or xylene; and/or aliphatic hydrocarbons such as heptane, hexane, or octane. Alternatively, the solvent may be a halogenated hydrocarbon such as dichloromethane, 1,1,1-trichloroethane or methylene chloride.

The amount of solvent can depend on various factors including the type of solvent selected and the amount and type of other starting materials selected. However, the amount of solvent may range from 0.1% to 99%, alternatively 2% to 50%, based on combined weights of starting materials A), B), and C).

Starting Material E) Neutralizing Agent

Starting material E) is neutralizing agent that may optionally be used to neutralize starting material A) after the product forms. Alumina, triphenyl amine, triphenyl phosphine, and phenylacetylene are suitable neutralizing agents. Neutralizing agents are known in the art and are commercially available, e.g., from Millipore Sigma of St. Louis, Mo., USA. The amount of neutralizing agent depends on various factors including the amount of starting material A), however, starting material E) may be present in an amount sufficient to provide a weight ratio of neutralizing agent to boron containing Lewis acid (E:A ratio) of 1:1 to 1000:1. Alternatively, when the neutralizing agent is triphenyl phosphine or phenylacetylene, the E:A ratio may be 1:1 to 20:1. Alternatively, when the neutralizing agent is alumina, the E:A ratio may be 100:1 to 1000:1.

Product of the Method

The product of the method described above comprises a) a polyfunctional organohydrogensiloxane and a by-product comprising $HR^2$. The product comprises a polyfunctional organohydrogensiloxane of formula a-1):

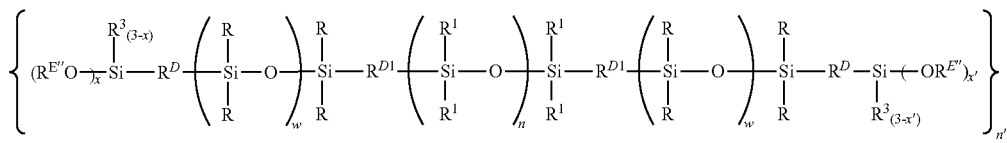

where subscripts x, w, n, and x' and groups R, R¹, R³, R$^D$, and R$^{D1}$ are as described above, subscript n' is 1 to 101, and each R$^{E''}$ has formula:

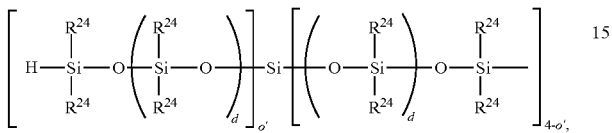

where group R$^{24}$ is as described above and subscript o'=0 to 3, alternatively 2 to 3, and alternatively 3.

Alternatively, when subscript n'=1, and each subscript o'=3, the product comprises a polyfunctional organohydrogensiloxane of formula a-2):

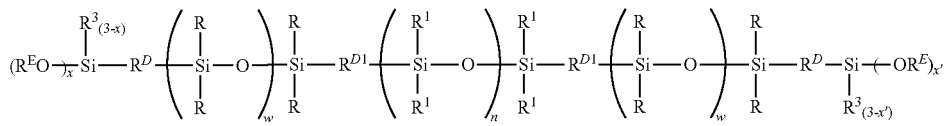

where subscripts x, w, n, and x' and groups R, R¹, R³, R$^D$, and R$^{D1}$ are as described above. In formula a-2), each R$^E$ is a group of formula

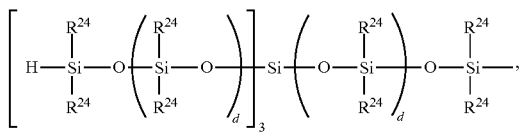

where subscript d and group R$^{24}$ are as described above. Alternatively, when each subscript d=0 in formula a-2), then the polyfunctional organohydrogensiloxane has formula a-3):

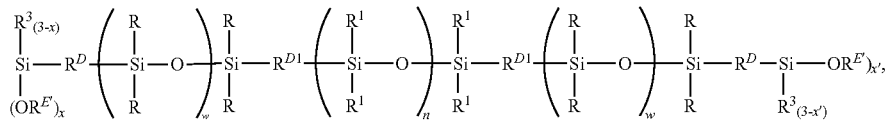

where subscripts x, w, n, and x' and groups R, R¹, R³, R$^D$, and R$^{D1}$ are as described above. In formula a-3), each R$^{E'}$ is a group of formula

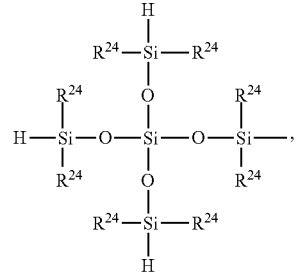

where group R$^{24}$ is as described above.

One skilled in the art would recognize that the product may comprise more than one species of polyfunctional organohydrogensiloxanes. Certain species may have two or more linear moieties derived from starting material B), and three or more branched moieties derived from starting material C), per molecule. Cyclic species wherein a linear moiety derived from starting material B) bonds to more than one branched moieties derived from starting material C) in the same molecule may also be formed and be present in the product. The architecture and distribution of species in the product depends on various factors including the molar ratio of starting material B) and starting material C) selected. However, without wishing to be bound by theory, it is thought that controlling molar ratio of starting material C) and starting material B) can maximize production of species of formula a-1) having subscript n'=1, i.e., the polyfunctional organohydrogensiloxane of formula a-2) and/or a-3) wherein the molecule has two branched moieties, each linked via an oxygen atom, at the ends of one linear polydiorganosiloxane moiety. For example, when the ratio of starting material C) and starting material B) decreases, there are more chances to form species having n'>1 in formula a-1). Therefore, starting materials B) and C) may be used in amounts such that the SiH:alkoxy molar ratio is >10:1, alternatively >20:1 to 40:1.

The polyfunctional organohydrogensiloxane produced by the method described above may be used, e.g., as an additive in a release coating composition. Without wishing to be bound by theory, it is thought that a) the polyfunctional organohydrogensiloxane may provide one or more benefits of 1) faster cure to a release coating composition as compared to a comparative release coating composition not containing starting material a) the polyfunctional organohydrogensiloxane, 2) improved reactivity in a release coating composition (when compared to a comparative release coating composition containing different SiH functional starting materials), and/or 3) improved anchorage of a release coating prepared by formulating a) the polyfunctional organohydrogensiloxane into a release coating composition that is cured on a substrate to form a release coating (as compared to a comparative release coating composition not containing a), the polyfunctional organohydrogensiloxane, which is cured to form a release coating on the substrate).

Method for Making Clustered Functional Organosiloxane

Alternatively, the method described above may further comprise functionalizing the polyfunctional organohydrogensiloxane to form a clustered functional organosiloxane. The method described above may further comprise:

combining starting materials comprising the product described above, or a) the polyfunctional organohydrogensiloxane recovered therefrom;

b) a hydrosilylation reaction catalyst; and c) a reactive species having an average, per molecule at least one aliphatically unsaturated group capable of undergoing an addition reaction with a silicon bonded hydrogen atom of starting material a) the polyfunctional organohydrogensiloxane, wherein starting material c) further comprises one or more curable groups per molecule. Briefly stated, this method may be performed by modifying the method described in U.S. Pat. No. 9,593,209. Starting material a) described hereinabove may be combined with the reactive species and the hydrosilylation reaction catalyst (described as components c) and d), respectively) in the amounts and under conditions described in U.S. Pat. No. 9,593,209 at col. 8, line 44 to col. 10, line 47.

Starting Material b) Hydrosilylation Reaction Catalyst

Hydrosilylation reaction catalysts suitable for starting material b) in the method for functionalizing the polyfunctional organohydrogensiloxane to form the clustered functional organosiloxane are known in the art and are commercially available. Hydrosilylation reaction catalysts include platinum group metal catalysts. Such hydrosilylation catalysts can be a metal selected from platinum, rhodium, ruthenium, palladium, osmium, and iridium. Alternatively, the hydrosilylation catalyst may be a compound of such a metal, for example, chloridotris(triphenylphosphane)rhodium(I) (Wilkinson's Catalyst), a rhodium diphosphine chelate such as [1,2-bis(diphenylphosphino)ethane]dichlorodirhodium or [1,2-bis(diethylphospino)ethane]dichlorodirhodium, chloroplatinic acid (Speier's Catalyst), chloroplatinic acid hexahydrate, platinum dichloride, and complexes of said compounds with low molecular weight organopolysiloxanes or platinum compounds microencapsulated in a matrix or coreshell type structure. Complexes of platinum with low molecular weight organopolysiloxanes include 1,3-diethenyl-1,1,3,3-tetramethyldisiloxane complexes with platinum (Karstedt's Catalyst) and methylvinylcyclosiloxane complexes with platinum (Ashby's Catalyst). These complexes may be microencapsulated in a resin matrix. Alternatively, a hydrosilylation catalyst may comprise 1,3-diethenyl-1,1,3,3-tetramethyldisiloxane complex with platinum. Exemplary hydrosilylation catalysts are described in U.S. Pat. Nos. 3,159,601; 3,220,972; 3,296, 291; 3,419,593; 3,516,946; 3,814,730; 3,989,668; 4,784,879; 5,036,117; and 5,175,325; and EP 0 347 895 B. Microencapsulated hydrosilylation catalysts and methods of preparing them are known in the art, as exemplified in U.S. Pat. Nos. 4,766,176 and 5,017,654. The amount used may be sufficient to provide 1 ppm to 1,000 ppm of platinum group metal based on combined weights of starting materials a), b), and c).

Starting Material c) Reactive Species

Starting material c) the reactive species described above for functionalizing the polyfunctional organohydrogensiloxane to form the clustered functional organosiloxane may comprise a silane of formula c-1): $R^4_y SiR^5_{(4-y)}$, where subscript y is 1 to 3, each $R^4$ is the aliphatically unsaturated group capable of undergoing an addition reaction, and each $R^5$ is an organic group containing the curable group. Alternatively, subscript y may be 1 to 2. Alternatively, subscript y may be 1. Each $R^4$ may be independently selected from the group consisting of alkenyl (such as vinyl, allyl, and hexenyl) and alkynyl (such as propynyl or hexynyl). Each $R^5$ may be independently selected from the group consisting of an organic group containing an acrylate group, an alcohol group, an alkoxy group, an epoxy group, an isocyanate group, a methacrylate group, and a urethane group. Alternatively, each $R^5$ may be independently selected from the group consisting of an organic group containing an acrylate group, an organic group containing an epoxy group, and an organic group containing a methacrylate group. Alternatively, each $R^5$ may be an organic group containing an epoxy group. Alternatively, each $R^5$ may be independently selected from the group consisting of an organic group containing an acrylate group and an organic group containing a methacrylate group. Suitable silanes are known in the art and are commercially available, e.g., from Dow Silicones Corporation of Midland, Mich., USA or Gelest, Inc. Exemplary silanes include allyltrimethoxysilane, allyltriethoxysilane, or a combination thereof.

Alternatively, starting material c) may comprise an organic compound that does not contain a silicon atom, e.g., of formula c-2): $R^6 R^7$, where each $R^6$ is an aliphatically unsaturated group capable of undergoing an addition reaction, and each $R^7$ is the curable group. Each $R^6$ may be independently selected from the group consisting of alkenyl (such as vinyl, allyl, and hexenyl) and alkynyl (such as propynyl or hexynyl). Each $R^7$ may be independently selected from the group consisting of an organic group containing an acrylate group, an alcohol group, an alkoxy group, an epoxy group, an isocyanate group, a methacrylate group, or a urethane group. Alternatively, each $R^7$ may be selected from the group consisting of an organic group containing an acrylate group, an organic group containing an epoxy group, and an organic group containing a methacrylate group. Alternatively, each $R^7$ may be an organic group containing an epoxy group. Alternatively, each $R^7$ may be independently selected from the group consisting of an organic group containing an acrylate group and an organic group containing a methacrylate group. Examples of suitable compounds of formula c-2) include allyl acrylate, allyl glycidyl ether, allyl methacrylate, and combinations thereof. Alternatively, c-2) may be allyl glycidyl ether. Alternatively, c-2) may be allyl methacrylate. Suitable compounds of formula c-2) are known in the art and are commercially available, e.g., from Millipore Sigma of St. Louis, Mo., U.S.A.

The starting materials used in the method for making the clustered functional organosiloxane may optionally further comprise one or more additional starting materials. The additional starting materials may be those additional ingredients disclosed in U.S. Pat. No. 9,593,209 at col. 10, line 48 to col. 16, line 17. The additional starting materials selected from the group consisting of filler, with or without treating agent, non-reactive resin, chain extender, endcapper, and catalyst inhibitor.

The method described above produces a product comprising a') a clustered functional organosiloxane, or masterbatch of clustered functional organosiloxane with the filler and/or non-reactive resin. The product comprises a clustered functional organosiloxane of formula a'-1):

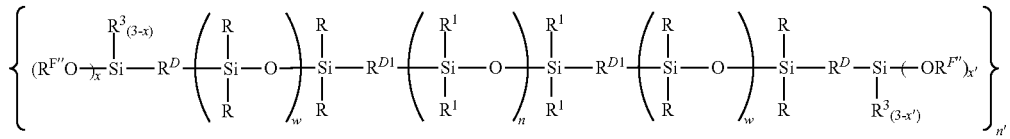

where subscripts x, w, n, n', and x' and groups R, $R^1$, $R^3$, $R^D$, and $R^{D1}$ are as described above, and each $R^{F''}$ is a group of formula

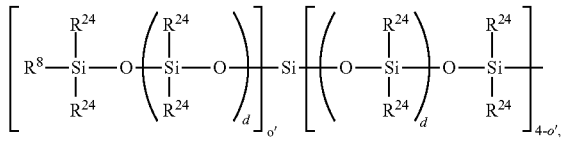

where subscript o' is as described above and each $R^8$ is a hydrogen atom or a curable group, with the proviso that at least one $R^8$ per molecule is a curable group. The curable group for $R^8$ is derived from starting material c) the reactive species described above. The curable group for $R^8$ may be independently selected from the group consisting of $R^{4'}SiR^5_{(4-y)}$, and $R^{6'}R^7$, where $R^{4'}$ and $R^{6'}$ are divalent hydrocarbon groups produced via hydrosilylation reaction of starting material c) and a silicon bonded hydrogen atom of starting material a) the polyfunctional organohydrogensiloxane. Alternatively, 1 to 4 instances of $R^8$ per molecule are curable groups (i.e., not hydrogen). Alternatively 1 to 3, alternatively 1 to 2, and alternatively an average of 2 instances of $R^8$ per molecule are curable groups (other than hydrogen).

Alternatively, when subscript n'=1 and each subscript o'=0 in formula a'-1), then the clustered functional organosiloxane has formula a'-2):

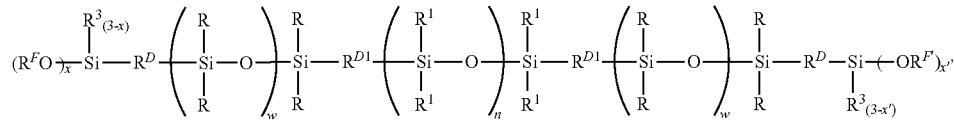

where subscripts x, w, n, and x' and groups R, $R^1$, $R^3$, $R^D$, and $R^{D1}$ are as described above, and each $R^F$ is a group of formula

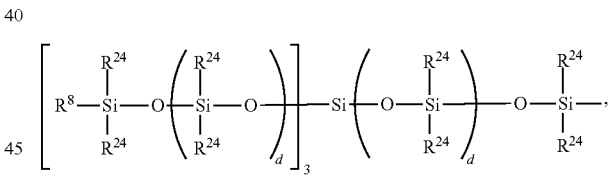

where subscript d and groups $R^{24}$ and $R^8$ are as described above.

The clustered functional organosiloxane prepared as described above may be used in an adhesive composition, such as a thermal radical cure adhesive composition, as, e.g., a crosslinker.

Alternatively, when each subscript d=0, and the clustered functional organosiloxane comprises formula a'-2):

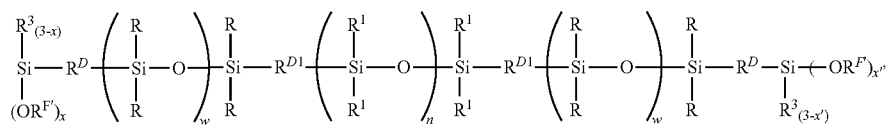

subscripts x, w, n, and x' and groups R, $R^1$, $R^3$, $R^D$, and $R^{D1}$ are as described above, and each $R^F$, is a group of formula

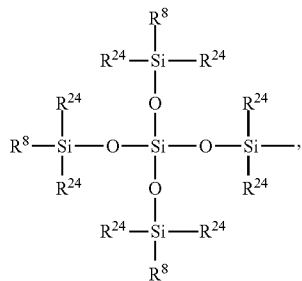

where $R^{24}$ and $R^8$ are as described above.

The clustered functional organosiloxane may be used, e.g., as an additive in an adhesive composition. Without wishing to be bound by theory, it is thought that a') the clustered functional organosiloxane may provide one or more benefits of 1) faster cure to the adhesive composition (as compared to a comparable adhesive composition not containing a') the clustered functional organosiloxane described above), and 2) improved tensile and elongation properties of an adhesive prepared by curing the adhesive composition, and/or 3) improved crosslinking of the adhesive composition.

Curable Composition

The products, described above, a) the polyfunctional organohydrogensiloxane, and a') the clustered functional organosiloxane are useful in curable compositions. The curable composition may comprise:

(I) one or more of the above described products, a) the polyfunctional organohydrogensiloxane, and a') the clustered functional organosiloxane; and
(II) a curing agent.

The curing agent selected will depend on the type and amount of curable substituents on starting material (I). For example, the curable substituent may be the SiH e.g., when a) the polyfunctional organohydrogensiloxane is included in the curable composition and/or when a') the clustered functional organosiloxane has SiH functionality in addition to the curable group introduced by starting material c) (the reactive species) in the method for functionalizing the polyfunctional organohydrogensiloxane, as described above. Alternatively, the curable substituent may be the curable group introduced by starting material c) used to make a') the clustered functional organosiloxane, as described above.

For example, when starting material (I) has SiH functionality, (II) the curing agent may be a hydrosilylation reaction catalyst, as exemplified by those described above for starting material b) in the method for functionalizing the polyfunctional organohydrogensiloxane described above.

Alternatively, when starting material (I) comprises the a') clustered functional organosiloxane with radical curable groups (such as organic groups containing epoxy, acrylate, or methacrylate functionality), the curing agent may comprise a radical initiator as (II) the curing agent. The radical initiator may be a thermal radical initiator, a radiation radical initiator, or a redox reagent. Thermal radical initiators include peroxides, which are known in the art and are commercially available as disclosed in U.S. Pat. No. 9,593, 209 at col. 16, line 49 to col. 17, line 26. Thermal radical initiators may be used in an amount of 0.01% to 15%, alternatively 0.1% to 5% and alternatively 0.1% to 2% based on combined weights of all starting materials in the curable composition.

Alternatively, the radical initiator may be a radiation photoinitiator. Radiation photoinitiators are known in the art and include cationic photoinitiators such as onium salts, and radiation photoinitiators are disclosed in U.S. Pat. No. 9,593,209 at col. 17, line 27 to col. 18, line 40. Suitable radiation photoinitiators may be used in the curable composition in an amount of 0.01% to 15%, alternatively 0.1% to 10%, alternatively 0.1% to 5% and alternatively 0.1% to 2% based combined weights of all starting materials in the curable composition.

Alternatively, the radical initiator may be a redox reagent, such as those disclosed in U.S. Pat. No. 9,593,209 at col. 21, lines 33 to 53.

Alternatively, when starting material (I) comprises the a') clustered functional organosiloxane with organic groups having OH, alkoxy, or other hydrolyzable groups, (II) the curing agent may comprise a condensation reaction catalyst, in an amount of 0.001% to 5% based on combined weights of all starting materials in the curable composition. Exemplary condensation reaction catalysts are those disclosed in U.S. Pat. No. 9,593,209 at col. 18, line 41 to 19, line 15.

Alternatively, when starting material (I) comprises the a') clustered functional organosiloxane, (II) the curing agent may comprise an organoborane amine complex. Suitable organoborane amine complexes are disclosed, for example, in U.S. Pat. No. 9,593,209 at col. 19, line 16 to col. 21, line 33.

Alternatively, when starting material (I) comprises the a') clustered functional organosiloxane with organic groups having isocyanate functionality or urethane functionality, (II) the curing agent may comprise a compound having two or more carbinol groups, such as a polyol, or an amine functional compound. Examples of such curing agents are disclosed at col. 21, lines 54 to 63.

Alternatively, when starting material (I) has more than one type of curable substituent, more than one type of curing agent may be used as starting material (II) in the curable composition. For example, a combination of a radical initiator and a condensation reaction catalyst may be used when starting material (I) has both radical curable groups and condensation reaction curable groups, such as epoxy and alkoxy. Alternatively, the combination of a hydrosilylation reaction catalyst and a condensation reaction catalyst may be used when starting material (I) has both SiH functionality and condensation reaction curable groups, such as alkoxy.

The curable composition may optionally further comprise one or more additional starting materials. These are exemplified by (III) a crosslinker, (IV) a solvent, (V) an adhesion promoter, (VI) a colorant, (VII) a reactive diluent, (VIII) a corrosion inhibitor, (IX) a polymerization inhibitor, (X) a filler, (XI) a filler treating agent, (XII) an acid acceptor, and a combination thereof. Suitable additional starting materials are described and exemplified as other optional ingredients in U.S. Pat. No. 9,592,209 at col. 22, line 5 to col. 29, line 8. Other additional starting materials may be added. For example, the curable composition may optionally further comprise (XIII) a reactive resin and polymer, (XIV) a dual cure compound, or both. The reactive resin and polymer for starting material (XIII) are known in the art, for example, see U.S. Pat. No. 9,670,392 at col. 16, line 21 to col. 18, line 35.

Thermal Radical Curable Composition

The curable composition may be a thermal radical curable composition. The thermal radical curable composition may be made as described in U.S. Pat. No. 9,670,392 by replacing the clustered functional organosiloxane described therein as component (I) with the clustered functional organosiloxane prepared as described for starting material a') hereinabove. The thermal radical curable composition may comprise:

(I) the clustered functional organosiloxane described above as starting material a'), or the product containing a') the clustered functional organosiloxane, (II) the curing agent comprising
(a) the radical initiator, and
(b) the condensation reaction catalyst,
(III) the crosslinker, and
(XIII) the reactive resin and polymer.

The thermal radical cure composition may further comprise (XIV) the dual cure compound (which is an organosilicon compound having both hydrolyzable and free radical reactive groups), (VIII) the corrosion inhibitor, and (V) the adhesion promoter, all of which starting materials are as described above.

Adhesive Composition

Alternatively, the curable composition may be an adhesive composition. The adhesive composition may comprise:

A) the clustered functional organosiloxane described above as starting material a'), or the product containing a') the clustered functional organosiloxane, where the clustered functional organosiloxane has acrylate functional groups, epoxy functional groups, and/or methacrylate functional groups, B) a reactive resin and polymer, C) a condensation reaction catalyst, and D) a free radical initiator.

Starting Material B) Reactive Resin and Polymer

Starting material B) in the adhesive composition is a reactive resin and polymer. The reactive resin and polymer may be (XIII) the reactive resin and polymer described above as starting material (XIII), see U.S. Pat. No. 9,670,392. Alternatively, the reactive resin and polymer may be a poly-alkoxy endblocked resin-polymer blend prepared as described in U.S. Provisional Patent Application Ser. No. 62/548,558 filed on 22 Aug. 2017. The poly-alkoxy endblocked resin-polymer blend comprises a reaction product of i) a siloxane resin comprising units of formulae $(R^{2'}_3SiO_{1/2})$ and $(SiO_{4/2})$, where each $R^{2'}$ is independently a monovalent hydrocarbon group, with the proviso that at least one $R^{2'}$ per molecule has aliphatic unsaturation, wherein the siloxane resin has a molar ratio of $(R^{2'}_3SiO_{1/2})$ units (M units) to $(SiO_{4/2})$ units (Q units) ranging from 0.5:1 to 1.5:1 (M:Q ratio), ii) a polydiorganosiloxane comprising units of formulae $(R^{2'}_3SiO_{1/2})_{ii}$ and $(R^{2'}_2SiO_{2/2})_{hh}$ (D units), where subscript hh is 20 to 1000 and subscript ii has an average value of 2, and iii) an alkoxy-functional organohydrogensiloxane oligomer. The alkoxy-functional organohydrogensiloxane oligomer has unit formula

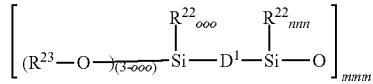

$(HR^{22}_2SiO_{1/2})_{ppp}(R^{22}_3SiO_{1/2})_{qqq}(HR^{22}SiO_{2/2})_{rrr}$
$(R^{22}_2SiO_{2/2})_{sss}(R^{22}SiO_{3/2})_{ttt}(HSiO_{3/2})_{uuu}(SiO_{4/2})_{kk}$, where each $D^1$ independently represents a divalent hydrocarbon group of 2 to 18 carbon atoms, such as those described above for $R^D$; each $R^{22}$ independently represents a monovalent hydrocarbon group of 1 to 18 carbon atoms or a monovalent halogenated hydrocarbon group of 1 to 18 carbon atoms (such as those described above for $R^1$), each $R^{23}$ is independently a monovalent hydrocarbon group of 1 to 18 carbon atoms (such as those described above for $R^1$), subscript nnn is 0 or 1, subscript ooo is 0, subscripts qqq, sss, and ttt have values such that 5≥qqq≥0, 5≥sss≥0, subscript ttt is 0 or 1, subscript kk is 0 or 1, subscript nnn >0, and a quantity (mmm+ppp+qqq+rrr+sss+ttt+uuu+kk) 50, with the proviso that >90 mol % of all $D^1$ groups in the endblocker are linear; and iv) a hydrosilylation reaction catalyst.

Starting Material C)—Condensation Reaction Catalyst

Starting material C) in the adhesive composition described above is a condensation reaction catalyst. The condensation reaction catalyst may be selected from common condensation catalysts that are effective for silanol-silanol condensation reaction, which include organometallic compounds, amines, and a wide range of organic and inorganic bases and acids. Organometallic compounds include organic compounds of tin, titanium, zinc, zirconium, hafnium, and others. The condensation reaction catalysts can be an organotin compound and an organotitanium compound. Exemplary organotin compounds may be selected from the group consisting of: a) stannic salts of carboxylic acids such as i) dibutyl tin dilaurate, ii) dimethyl tin dilaurate, iii) di-(n-butyl)tin bis-ketonate, iv) dibutyl tin diacetate, v) dibutyl tin maleate, vi) dibutyl tin diacetylacetonate, vii) dibutyl tin dimethoxide, viii) carbomethoxyphenyl tin trisuberate, ix) dibutyl tin dioctanoate, x) dibutyl tin diformate, xi) isobutyl tin triceroate, xii) dimethyl tin dibutyrate, xiii) dimethyl tin di-neodeconoate, xiv) dibutyl tin di-neodeconoate, xv) triethyl tin tartrate, xvi) dibutyl tin dibenzoate, xvii) butyltintri-2-ethylhexanoate, xviii) dioctyl tin diacetate, xix) tin octylate, xx) tin oleate, xxi) tin butyrate, xxii) tin naphthenate, xxiii) dimethyl tin dichloride; b) tin (II) salts of organic carboxylic acids such as xxiv) tin (II) diacetate, xxv) tin (II) dioctanoate, xxvi) tin (II) diethylhexanoate, xxvii) tin (II) dilaurate, c) stannous salts of carboxylic acids such as xxviii) stannous octoate, xxix) stannous oleate, xxx) stannous acetate, xxxi) stannous laurate, xxxii) stannous stearate, xxxiii) stannous naphthanate, xxxiv) stannous hexanoate, xxxv) stannous succinate, xxxvi) stannous caprylate, and d) a combination of two or more of i) to xxxvi). Exemplary organotitanium compounds may be selected from the group consisting of: i) tetra-n-butyl titanate, ii) tetraisopropyl titanate, iii) tetra-t-butyl titanate, iv) tetrakis (2-ethylhexyl) titanate, v) acetylacetonate titanate chelate, vi) ethyl acetoacetate titanate chelate, vii) triethanolamine titanate chelate, viii) tri-n-butyl titanate, and ix) a combination of two or more of i), ii), iii), iv), v), vi), vii), and viii).

The amount of condensation reaction catalyst in the adhesive composition depends on various factors including the selection of the other starting materials, whether any additional starting materials are added, and the end use of the adhesive composition. However, the condensation reaction catalyst may be present in an amount ranging from 0.01% to 25% based on combined weights of all starting materials in the adhesive composition. Alternatively, the condensation reaction catalyst may be present in an amount of 0.1% to 25%, alternatively 0.1% to 15%, alternatively 0.5% to 15%, alternatively 0.5% to 10%, alternatively 0.1% to 5%.

Starting Material D)—Free Radical Initiator

Starting material D) in the adhesive composition described above is a free radical initiator. The free radical initiator may comprise an azo compound or an organic peroxide compound. Suitable azo compounds include azobenzene, azobenzene-p-sulfonic acid, azobisdimethyl-valeronitrile, azobisisobutyronitrile, and a combination thereof. Suitable organic peroxide compounds include dialkyl peroxides, diaryl peroxides, diacyl peroxides, alkyl hydroperoxides, and aryl hydroperoxides. Specific organic peroxide compounds are as described above for starting material (II). Alternatively, the organic peroxide may be exemplified by benzoyl peroxide; dibenzoyl peroxide; 4-monochlorobenzoyl peroxide; dicumyl peroxide; tert-butylperoxybenzoate; tert-butyl cumyl peroxide; tert-butyloxide 2,5-dimethyl-2,5-di-tert-butylperoxyhexane; 2,4-dichlorobenzoyl peroxide; di-tertbutylperoxy-diisopropyl benzene; 1,1-bis(tert-butylperoxy)-3,3,5-trimethylcyclohexane; 2,5-di-tert-butylperoxyhexane-3,2,5-dimethyl-2,5-bis(tert-butylperoxy) hexane; cumyl-tert-butyl peroxide; or combinations of two or more thereof.

The amount of free radical initiator added to the adhesive composition depends on various factors including the type and amount of condensation reaction catalyst selected and the selection of other starting materials in the adhesive composition, however, the free radical initiator may be present in an amount of 0.1% to 5%, alternatively 0.2% to 3%, alternatively 0.5% to 2%, based on the combined weights of all starting materials in the adhesive composition.

Additional Starting Materials in the Adhesive Composition

The adhesive composition described above may further comprise one or more additional starting materials (distinct from and added in addition to starting materials A), B), C) and D) described above). The additional starting materials may be selected from the group consisting of E) a dual cure compound, F) an adhesion promoter, G) a corrosion inhibitor, H) a rheology modifier, I) a drying agent, J) a cross-linker, K) a filler, L) a spacer, M) an acid scavenger, N) a silanol functional polydiorganosiloxane, O) a fluorescent optical brightener, P) a chain transfer agent, Q) a (meth)acrylate monomer, R) a poly-alkoxy terminated polydiorganosiloxane, S) a colorant, and two or more of E), F), G), H), 1), J), K), L), M), N), O), P), Q), R), and S).

Starting Material E)—Dual Cure Compound

The adhesive composition described above may optionally further comprise starting material E) a dual cure compound. The dual cure compound is an organosilicon compound having, per molecule, at least one hydrolyzable group and at least one free radical reactive group. The organosilicon compound for starting material E) may comprise a silane of formula $R^{14}_{mm}R^{22}_{nn}SiX_{(4-mm-nn)}$, where $R^{22}$ is as described above, $R^{14}$ is a curable group (such as an acrylate functional group, an epoxy functional group or a methacrylate functional group), X is a hydrolysable group, subscript mm is 1 to 2, subscript nn is 0 to 2, and a quantity (mm+nn) is 2 to 3.

Each X independently represents a hydrolyzable group, which may be selected from an acetamido group, an acyloxy group such as acetoxy, an alkoxy group, an amido group, an amino group, an aminoxy group, an oximo group, a ketoximo group, and a methylacetamido group. X is not a hydroxyl group. Alternatively, each X may be an acetoxy group or an alkoxy group. Alternatively, each X is an alkoxy group, such as methoxy, ethoxy, propoxy or butoxy; alternatively methoxy.

Alternatively, the organosilicon compound for starting material E) may comprise a polyorganosiloxane of unit formula:

$$(X_{mm}R^{22}_{(3-mm)}SiO_{1/2})_{oo}(R^{14}R^{22}_{2}SiO_{1/2})_{pp}$$
$$(R^{22}_{2}SiO_{2/2})_{qq}(R^{22}XSiO_{2/2})_{rr}$$
$$(R^{14}R^{22}SiO_{2/2})_{ss}(R^{14}SiO_{3/2})_{ww}(R^{22}SiO_{3/2})_{tt}(SiO_{4/2})_{uu},$$

where $R^{22}$, $R^{14}$, and X and subscript mm are as described above, subscript oo≥0, subscript pp≥0, subscript qq≥0, subscript rr≥0, subscript ss≥0, subscript ww≥0, subscript tt≥0, and subscript uu≥0, with the provisos that a quantity (oo+rr) 1, a quantity (pp+ss+ww) 1, and a quantity (oo+pp+qq+rr+ss+ww+tt+uu) >2. Alternatively, subscript oo is 0 to 100, alternatively 0 to 50, alternatively 0 to 20, alternatively 0 to 10, alternatively, 1 to 50, alternatively, 1 to 20, and alternatively 1 to 10. Alternatively, subscript pp may be 0 to 100, alternatively 0 to 50, alternatively 0 to 20, alternatively 0 to 10, alternatively 1 to 50, alternatively 1 to 20, and alternatively 1 to 10. Alternatively, subscript qq is 0 to 1,000, alternatively 0 to 500, alternatively 0 to 200, alternatively 0 to 100, alternatively 1 to 500, alternatively 1 to 200, and alternatively 1 to 100. Alternatively, subscript rr is 0 to 100, alternatively 0 to 50, alternatively 0 to 20; alternatively 0 to 10, alternatively 1 to 50, alternatively 1 to 20, and alternatively 1 to 10. Alternatively, subscript ss is 0 to 100, alternatively 0 to 50, alternatively 0 to 20, alternatively 0 to 10, alternatively 1 to 50, alternatively 1 to 20, and alternatively 1 to 10. Alternatively, subscript ww is 0 to 100, alternatively 0 to 50, alternatively 0 to 20, alternatively 0 to 10, alternatively 1 to 50, alternatively 1 to 20, and alternatively 1 to 10. Alternatively, subscript tt is 0 to 1,000, alternatively 0 to 500, alternatively 0 to 200; alternatively 0 to 100, alternatively 1 to 500, alternatively 1 to 200, and alternatively 1 to 100. Alternatively, subscript uu is 0 to 1,000, alternatively 0 to 500, alternatively 0 to 200, alternatively 0 to 100, alternatively 1 to 500, alternatively 1 to 200, and alternatively 1 to 100.

Examples of starting material E) include silanes, such as methacryloxypropyltrimethoxysilane, acryloxypropyltrimethoxysilane, acryloxypropyltriethoxysilane, methacryloxypropyltriethoxysilane, methacryloxypropylmethyldimethoxysilane, acryloxypropylmethyldimethoxysilane, acryloxypropyldimethylmethoxysilane, and methacryloxypropyldimethylmethoxysilane.

The amount of dual cure compound in the adhesive composition depends on various factors including the selection of the other starting materials, whether any additional starting materials are added, and the end use of the composition. However, the dual cure compound may be present in an amount ranging from 0.01% to 25% based on combined weights of all starting materials in the adhesive composition. Alternatively, the dual cure compound may be present in an amount of 0.1% to 25%, alternatively 0.1% to 15%, alternatively 0.5% to 15%, alternatively 0.5% to 10%, alternatively 0.1% to 5%.

Starting Material F)—Adhesion Promoter

The adhesive composition described above may optionally further comprise F) an adhesion promoter. Suitable adhesion promoters may comprise a transition metal chelate, a hydrocarbonoxysilane such as an alkoxysilane, a combination of an alkoxysilane and a hydroxy-functional polyorganosiloxane, an aminofunctional silane, or a combination thereof. Adhesion promoters may comprise silanes having the formula $R^{15}_{aaa}R^{16}_{bbb}Si(OR^{17})_{4-(aaa+bbb)}$ where each $R^{15}$ is independently a monovalent organic group having at least 3 carbon atoms; $R^{16}$ contains at least one SiC bonded substituent having an adhesion-promoting group, such as amino, epoxy, mercapto or acrylate groups; each $R^{17}$ is independently a saturated hydrocarbon group such as an alkyl group of 1 to 4 carbon atoms; subscript aaa has a value ranging from 0 to 2; subscript bbb is either 1 or 2; and a quantity (aaa+bbb) is not greater than 3. Alternatively, the adhesion promoter may comprise a partial condensate of the above silane. Alternatively, the adhesion promoter may comprise a combination of an alkoxysilane and a hydroxy-functional polyorganosiloxane, such as trimethoxysilyl terminated polydimethylsiloxane, which is commercially available from Dow Silicones Corporation of Midland, Mich., USA.

Alternatively, the adhesion promoter may comprise an unsaturated or epoxy-functional compound. The adhesion promoter may comprise an unsaturated or epoxy-functional alkoxysilane. For example, the functional alkoxysilane can have the formula $R^{18}_{ccc}Si(OR^{19})_{(4-ccc)}$, where subscript ccc is 1, 2, or 3, alternatively subscript ccc is 1. Each $R^{18}$ is independently a monovalent organic group with the proviso that at least one $R^{18}$ is an unsaturated organic group or an epoxy-functional organic group. Epoxy-functional organic groups for $R^{18}$ are exemplified by 3-glycidoxypropyl and (epoxycyclohexyl)ethyl. Unsaturated organic groups for $R^{18}$ are exemplified by 3-methacryloyloxypropyl, 3-acryloyloxypropyl, and unsaturated monovalent hydrocarbon groups such as vinyl, allyl, hexenyl, undecylenyl. Each $R^{19}$ is independently a saturated hydrocarbon group of 1 to 4 carbon atoms, alternatively 1 to 2 carbon atoms. $R^{19}$ is exemplified by methyl, ethyl, propyl, and butyl.

Examples of suitable epoxy-functional alkoxysilanes include 3-g lycidoxypropyltrimethoxysilane, 3-g lycidoxypropyltriethoxysilane, (epoxycyclohexyl)ethyldimethoxysilane, (epoxycyclohexyl)ethyldiethoxysilane, (epoxycyclohexyl)ethyltrimethoxysilane such as beta-(3,4-epoxycyclohexyl)ethyltrimethoxysilane, (epoxycyclohexyl) ethyltriethoxysilane, and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof.

Alternatively, the adhesion promoter may comprise an epoxy-functional siloxane such as a reaction product of a hydroxy-terminated polyorganosiloxane with an epoxy-functional alkoxysilane, as described above, or a physical blend of the hydroxy-terminated polyorganosiloxane with the epoxy-functional alkoxysilane. The adhesion promoter may comprise a combination of an epoxy-functional alkoxysilane and an epoxy-functional siloxane. For example, the adhesion promoter is exemplified by a mixture of 3-glycidoxypropyltrimethoxysilane and a reaction product of hydroxy-terminated methylvinylsiloxane with 3-g lycidoxypropyltrimethoxysilane, or a mixture of 3-g lycidoxypropyltrimethoxysilane and a hydroxy-terminated methylvinylsiloxane, or a mixture of 3-g lycidoxypropyltrimethoxysilane and a hydroxy-terminated methylvinyl/dimethylsiloxane copolymer.

Alternatively, the adhesion promoter may comprise an aminofunctional silane, such as an aminofunctional alkoxysilane exemplified by $H_2N(CH_2)_2Si(OCH_3)_3$, $H_2N(CH_2)_2Si(OCH_2CH_3)_3$, 3-aminopropyltrimethoxysilane of formula $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, and a combination thereof.

Alternatively, the adhesion promoter may comprise a transition metal chelate. Suitable transition metal chelates include titanates, zirconates such as zirconium acetylacetonate, aluminum chelates such as aluminum acetylacetonate, and combinations thereof.

Alternatively, the adhesion promoter may comprise a triazine based compound that bears functionality to react with starting material A), starting material B), or, when present, starting material E), or two or more thereof. The triazine ring can be mono-, di-, or tri-substituted and at least one of the substitute group is the functionality to react. The functionality can be a free radical reactive one or a condensation reactive one. Examples of triazine compound with free radical reactive functional groups include triallylisocyanurate, diallylpropylisocyanurate, tri-(methacryloxypropyl)isocyanurate, triallyloxytriazine, trimethacryloxytriazine, triacryloylhexahydrotriazine, and tris[2-(acryloyloxy)ethyl] isocyanurate. Examples of triazine compound with condensation reactive group include 2,4,6-tris(methyldimethoxysilyl)triazine, and tris[3-(trimethoxysilyl)propyl] isocyanurate.

The exact amount of adhesion promoter depends on various factors including the selection and amounts of other starting materials in the adhesive composition. However, the adhesion promoter, when present, may be added to the adhesive composition in an amount of 0.01 to 50 weight parts based on combined weight of all starting materials in the composition, alternatively 0.01 to 10 weight parts, and alternatively 0.01 to 5 weight parts. Examples of suitable adhesion promoters are described in U.S. Pat. No. 9,156,948.

Starting Material G)—Corrosion Inhibitor

The adhesive composition may optionally further comprise starting material G), a corrosion inhibitor. Examples of suitable corrosion inhibitors include benzotriazole, mercaptobenzothiazole, mercaptabenzotriazole and commercially available corrosion inhibitors such as 2-mercaptobenzothiazole from Millipore Sigma, 2,5-dimercapto-1,3,4-thiadiazole derivative (CUVAN™ 826) and alkylthiadiazole (CUVAN™ 484) from R. T. Vanderbilt of Norwalk, Conn., U.S.A. Examples of suitable corrosion inhibitors are exemplified by those described in U.S. Pat. No. 9,156,948. When present, the amount of corrosion inhibitor) may be 0.05% to 0.5% based on combined weights of all starting materials in the adhesive composition.

Starting Material H)—Rheology Modifier

The adhesive composition may optionally further comprise up to 5%, alternatively 1% to 2% based on combined weights of all starting materials in the composition, of starting material H) a rheology modifier. Rheology modifiers are commercially available. Examples of suitable rheology modifiers include polyamides, hydrogenated castor oil derivatives, metal soaps, microcrystalline waxes, and combinations thereof. Examples of suitable rheology modifiers are exemplified by those described in U.S. Pat. No. 9,156,948. The amount of rheology modifier depends on various factors including the specific rheology modifier selected and the selections of the other starting materials used in the composition. However, the amount of rheology modifier may be 0 parts to 20 parts, alternatively 1 part to 15 parts, and alternatively 1 part to 5 parts based on combined weights of all starting materials in the adhesive composition.

Starting Material I)—Drying Agent

The composition described above may optionally further comprise starting material I) a drying agent. The drying agent binds water from various sources. For example, the drying agent may bind by-products of the condensation reaction, such as water and alcohols. Examples of suitable drying agents are disclosed, for example, in U.S. Pat. No. 9,156,948. Examples of suitable adsorbents for the drying agent may be inorganic particulates, e.g., zeolites such as chabasite, mordenite, and analcite; molecular sieves such as alkali metal alumino silicates, silica gel, silica-magnesia gel, activated carbon, activated alumina, calcium oxide, and combinations thereof. The adsorbent may have a particle size of 10 μm or less. The adsorbent may have average pore size sufficient to adsorb water and alcohols, for example 10 Å (Angstroms) or less.

Alternatively, the drying agent may bind the water and/or other by-products by chemical means. An amount of a silane crosslinker added to the composition (in addition to any silane crosslinker used as starting material J)) may function as a chemical drying agent. Without wishing to be bound by theory, it is thought that the chemical drying agent may be added to the dry part of a multiple part composition to keep the composition free from water after the parts of the composition are mixed together. For example, alkoxysilanes suitable as drying agents include vinyltrimethoxysilane, vinyltriethoxysilane, methyltrimethoxysilane, isobutyltrimethoxysilane, and combinations thereof. The amount of drying agent depends on the specific drying agent selected. However, when starting material I) is a chemical drying agent, the amount may range from 0 parts to 15 parts, alternatively 0 parts to 10 parts, alternatively 0 parts to 5 parts, alternatively 0.1 parts to 0.5 parts, based on combined weights of all starting materials in the composition.

Starting Material J)—Crosslinker

The composition described above may optionally further comprise starting material J), a crosslinker. The crosslinker may comprise a silane crosslinker having hydrolyzable groups or partial or full hydrolysis products thereof. The crosslinker has an average, per molecule, of greater than two substituents reactive with the hydrolyzable groups on starting material B). Examples of suitable silane crosslinkers may have the general formula $R^{20}{}_{ddd}Si(R^{21})_{(4-ddd)}$, where each $R^{20}$ is independently a monovalent hydrocarbon group such as an alkyl group; each $R^{21}$ is a hydrolyzable substituent, which may be a group the same as X described above. Alternatively, each $R^{21}$ may be, for example, a hydrogen atom, a halogen atom, an acetamido group, an acyloxy group such as acetoxy, an alkoxy group, an amido group, an amino group, an aminoxy group, a hydroxyl group, an oximo group, a ketoximo group, or a methylacetamido group; and each instance of subscript ii may be 0, 1, 2, or 3. For the silane crosslinker, subscript ddd has an average value greater than 2. Alternatively, subscript ddd may have a value ranging from 3 to 4. Alternatively, each $R^{21}$ may be independently selected from hydroxyl, alkoxy, acetoxy, amide, or oxime. Alternatively, the silane crosslinker may be selected from an acyloxysilane, an alkoxysilane, a ketoximosilane, and an oximosilane.

The silane crosslinker may comprise an alkoxysilane exemplified by a dialkoxysilane, such as a dialkyldialkoxysilane; a trialkoxysilane, such as an alkyltrialkoxysilane; a tetraalkoxysilane; or partial or full hydrolysis products thereof, or another combination thereof. Examples of suitable trialkoxysilanes include methyltrimethoxysilane, methyltriethoxysilane, ethyltrimethoxysilane, ethyltriethoxysilane, isobutyltrimethoxysilane, isobutyltriethoxysilane, and a combination thereof, and alternatively methyltrimethoxysilane. Examples of suitable tetraalkoxysilanes include tetraethoxysilane. Alternatively, the silane crosslinker may comprise an acyloxysilane, such as an acetoxysilane. Acetoxysilanes include a tetraacetoxysilane, an organotriacetoxysilane, a diorganodiacetoxysilane, or a combination thereof. Exemplary acetoxysilanes include, but are not limited to, tetraacetoxysilane, methyltriacetoxysilane, ethyltriacetoxysilane, vinyltriacetoxysilane, propyltriacetoxysilane, butyltriacetoxysilane, phenyltriacetoxysilane, octyltriacetoxysilane, dimethyldiacetoxysilane, phenylmethyldiacetoxysilane, vinylmethyldiacetoxysilane, diphenyl diacetoxysilane, tetraacetoxysilane, and combinations thereof. Alternatively, the crosslinker may comprise organotriacetoxysilanes, for example mixtures comprising methyltriacetoxysilane and ethyltriacetoxysilane. Examples of silanes suitable for starting material J) containing both alkoxy and acetoxy groups that may be used in the composition include methyldiacetoxymethoxysilane, methylacetoxydimethoxysilane, vinyldiacetoxymethoxysilane, vinylacetoxydimethoxysilane, methyldiacetoxyethoxysilane, metylacetoxydiethoxysilane, and combinations thereof.

Alternatively, the crosslinker may comprise an aminofunctional such as $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, or a combination thereof, and a combination thereof. Examples of suitable silane crosslinkers are disclosed in U.S. Pat. No. 9,156,948.

Alternatively, the crosslinker may comprise a multifunctional (meth)acrylate crosslinker, such as a di(meth)acrylate exemplified Such crosslinkers are exemplified by ethylene glycol dimethacrylate, ethylene glycol diacrylate, triethylene glycol dimethacrylate, diethylene glycol bismethacryloxy carbonate, polyethylene glycol diacrylate, tetraethylene glycol dimethacrylate, diglycerol diacrylate, diethylene glycol dimethacrylate, pentaerythritol triacrylate, trimethylolpropane triglycidyl ether, trimethylolpropane tris(2-methyl-1-aziridine)propionate, trimethylol propane trimethacrylate, acrylate tipped urethane containing prepolymers, polyether diacrylates, and dimethacrylates, and combinations of two or more thereof. Suitable multifunctional (meth)acrylate crosslinkers are disclosed, for example, in U.S. Pat. No. 8,304,543 at col. 11 lines 46-65.

When present, the crosslinker may be added in an amount ranging from 0.1% to 10% based on the combined weights of all starting materials in the adhesive composition.

Starting Material K)—Filler

The composition described above may optionally further comprise K) a filler. The filler may comprise a reinforcing filler, an extending filler, a conductive filler, or a combination thereof. For example, the composition may optionally further comprise starting material (K1), a reinforcing filler, which when present may be added in an amount of 0.1% to 95%, alternatively 1% to 60%, based on combined weights of all starting materials in the adhesive composition. The exact amount of starting material (K1) depends on various factors including the form of the reaction product of the composition and whether any other fillers are added. Examples of suitable reinforcing fillers include reinforcing silica fillers such as fume silica, silica aerogel, silica xerogel, and precipitated silica. Fumed silicas are known in the art and commercially available; e.g., fumed silica sold under the name CAB-O-SIL by Cabot Corporation of Massachusetts, U.S.A.

The adhesive composition may optionally further comprise starting material (K2) an extending filler in an amount ranging from 0.1% to 95%, alternatively 1% to 60%, and alternatively 1% to 20%, based on combined weights of all starting materials in the adhesive composition. Examples of extending fillers include crushed quartz, aluminium oxide, magnesium oxide, calcium carbonate such as precipitated calcium carbonate, zinc oxide, talc, diatomaceous earth, iron oxide, clays, mica, chalk, titanium dioxide, zirconia, sand, carbon black, graphite, or a combination thereof. Extending fillers are known in the art and commercially available; such as a ground silica sold under the name MIN-U-SIL by U.S. Silica of Berkeley Springs, W. Va. Suitable precipitated calcium carbonates included Winnofil™ SPM from Solvay and Ultrapflex™ and Ultrapflex™ 100 from SMI. Examples of suitable fillers are disclosed in U.S. Pat. No. 9,156,948.

Starting Material L)—Spacer

The adhesive composition described above may optionally further comprise L) a spacer. Spacers can comprise organic particles, inorganic particles, or a combination thereof. Spacers can be thermally conductive, electrically conductive, or both. Spacers can have a desired particle size, for example, particle size may range from 25 μm to 125 μm. Spacers can comprise monodisperse beads, such as glass or polymer (e.g., polystyrene) beads. Spacers can comprise thermally conductive fillers such as alumina, aluminum nitride, atomized metal powders, boron nitride, copper, and silver. The amount of spacer depends on various factors including the particle size distribution, pressure to be applied during use of the composition prepared by mixing the parts, or the cured product prepared therefrom, temperature during use, and desired thickness of the mixed composition or the cured product prepared therefrom. However, the composition may contain an amount of spacer of 0.05% to 2%, alternatively 0.1% to 1% based on combined weights of all starting materials in the composition.

Starting Material M)—Acid Scavenger

The composition described above may optionally further comprise M) an acid scavenger. Suitable acid scavengers include various inorganic and organic compounds that are basic in nature, such as magnesium oxide, calcium oxide, and combinations thereof. The composition may comprise 0% to 10% of acid scavenger based on the combined weights of all starting materials in the composition.

Starting Material N)—Silanol Functional Polydiorganosiloxane

The composition described above may optionally further comprise N) a silanol functional polydiorganosiloxane. Starting material N) may comprise a polydiorganosiloxane of the formula $HOR^{22}_2SiO(R^{22}_2SiO)_{eee}((HO)R^{22}SiO)_{fff}SiR^{22}_2OH$, the formula $R_3SiO(R_2SiO)_{ggg}((HO)RSiO)_{hhh}SiR_3$, or a combination thereof, where $R^{22}$ is as described above. Subscript eee may be 0 or a positive number. Alternatively, subscript eee has an average value of at least 2. Alternatively subscript eee may be 2 to 2000. Subscript fff may be 0 or a positive number. Alternatively, subscript fff may have an average value of 0 to 2000. Subscript ggg may be 0 or a positive number. Alternatively, subscript ggg may have an average value of 0 to 2000. Subscript hhh has an average value of at least 2. Alternatively subscript hhh may have an average value ranging from 2 to 2000.

Starting material N) may comprise a polydiorganosiloxane such as
i) hydroxy-terminated polydimethylsiloxane,
ii) hydroxy-terminated poly(dimethylsiloxane/methylphenylsiloxane),
iii) trimethylsiloxy-terminated poly(dimethylsiloxane/methylhydroxysiloxane), and
iv) a combination of two or more of i), ii) and iii).

Hydroxyl-endblocked polydiorganosiloxanes suitable for use as starting material N) may be prepared by methods known in the art, such as hydrolysis and condensation of the corresponding organohalosilanes or equilibration of cyclic polydiorganosiloxanes. When added to the adhesive composition, starting material N) may be present in an amount of 0.1% to 20%, alternatively 0.1% to 10%, and alternatively 0.1% to 5% based on combined weights of all starting materials in the adhesive composition.

Starting Material O)—Optical Brightener

The adhesive composition described above may optionally further comprise starting material 0), an optical brightener. Suitable optical brighteners are commercially available, such as 2,5-thiophenediylbis(5-tert-butyl-1,3-benzoxazole), commercially available as TINOPAL OB. When added to the composition, the optical brightener may be present in an amount of 0.1% to 2% based on combined weights of all starting materials in the adhesive composition.

Starting Material P)—Chain Transfer Agent

The adhesive composition described above may optionally further comprise a P) chain transfer agent. When added to the adhesive composition, the chain transfer agent may be present in an amount of 0.01% to 5%, alternatively 0.01% to 2%, and alternatively 0.1 to 2%, based on combined weights of all starting materials in the composition.

Starting Material Q)—(Meth)acrylate Monomer

The adhesive composition described above may optionally further comprise starting material Q), a (meth)acrylate monomer. The (meth)acrylate monomer is exemplified by methylacrylate, butylacrylate, 2-ethylhexylacrylate, isobornylacrylate, terahydrofurfuryl acrylate, cyclohexylmethylacrylate methyl methacrylate, butylmethacrylate, 2-ethylhexylmethacrylate, isobornylmethacrylate, terahydrofurfuryl methacrylate, and cyclohexylmethylmethacrylate. When added to the adhesive composition, the (meth)acrylate monomer may be present in an amount of 0.1% to 35%, alternatively 0.1% to 25%, alternatively 0.1 to 15%, and alternatively 0.1% to 10%, based on combined weights of all starting materials in the adhesive composition.

Starting Material R)—Poly-Alkoxy Terminated Polydiorganosiloxane

Starting material R) is a poly-alkoxy terminated polydiorganosiloxane, in addition to any that would be prepared via preparation of starting material B), described above. Starting material R) may be a poly-alkoxy terminated polydiorganosiloxane prepared as described above for starting material B), except without including the siloxane resin. Alternatively, starting material R) may be a poly-alkoxy terminated polydiorganosiloxane prepared via a platinum catalyzed hydrosilylation reaction.

Starting Material S)—Colorant

The adhesive composition described above may optionally further comprise starting material S), a colorant. The colorant may be a dye or pigment, such as carbon black.

When selecting starting materials for the adhesive composition described above, there may be overlap between types of starting materials because certain starting materials described herein may have more than one function. For example, certain alkoxysilanes may be useful as crosslinkers and/or adhesion promoters and/or drying agents. Certain particulates may be useful as fillers and spacers. When adding additional starting materials to the adhesive composition, the additional starting materials are distinct from one another.

Method for Preparing the Adhesive Composition

The adhesive composition described above may be prepared by 1) combining starting materials B) i) the organosiloxane resin and B) ii) the polydiorganosiloxane to form B) the resin polymer blend (RPB). Solvent may optionally be used to homogenize the RPB. One or more of the starting materials, such as the organosiloxane resin may be dissolved or dispersed in a solvent, such as those described above, e.g., an aromatic hydrocarbon such as benzene, toluene or xylene. The amount of solvent may be 0 to 60%, alternatively 10% to 50%, and alternatively 20% to 40% based on combined weights of all starting materials in the adhesive composition. Starting materials B) iii) and B) iv) as described above, may be combined with the RPB to form a converted RPB. The method may further comprise: 2) combining the converted RPB and starting materials A), C), and D) by any convenient means, such as mixing. One or more additional starting materials E) to S) as described above may be added during step 1), step 2) or both. The starting materials may be combined at 20° C. to 150° C. The method may further comprise heating the starting materials at a temperature of 50° C. to 150° C., alternatively 60° C. to 120° C. in step 1), step 2) or both. The pressure is not critical; the method may be performed at ambient pressure.

Release Coating Composition

Alternatively, the curable composition may be a release coating composition. The release coating composition comprises:
(i) the a) polyfunctional organohydrogensiloxane, or product of the method described above said product comprising the polyfunctional organohydrogensiloxane, as described above;
(ii) a polyorganosiloxane having an average, per molecule, of at least two silicon bonded aliphatically unsaturated groups capable of undergoing hydrosilylation reaction,
(iii) a hydrosilylation reaction catalyst, and
(iv) a hydrosilylation reaction inhibitor.

Starting Material (ii) Polyorganosiloxane Having Aliphatically Unsaturated Groups Starting material (ii) in the release coating composition is a polyorganosiloxane having an average, per molecule, of at least two silicon bonded aliphatically unsaturated groups capable of undergoing hydrosilylation reaction; alternatively a polyorganosiloxane having an average, per molecule, of at least two silicon bonded groups having terminal aliphatic unsaturation. This polyorganosiloxane may be linear, branched, partly branched, cyclic, resinous (i.e., have a three-dimensional network), or may comprise a combination of different structures. The polyorganosiloxane may have average formula: $R^{13}_a SiO_{(4-a)/2}$, where each $R^{13}$ is independently selected from a monovalent hydrocarbon group or a monovalent halogenated hydrocarbon group, with the proviso that in each molecule, at least two of $R^{13}$ include aliphatic unsaturation, and where subscript a is selected such that $0<a\leq 3.2$. Suitable monovalent hydrocarbon groups and monovalent halogenated hydrocarbon groups for $R^{13}$ are as described above for $R^1$. The average formula above for the polyorganosiloxane may be alternatively written as $(R^{13}_3 SiO_{1/2})_b (R^{13}_2 SiO_{2/2})_c (R^{13} SiO_{3/2})_d (SiO_{4/2})_e$, where $R^{13}$ is defined above, and subscripts b, c, d, and e are each independently from 0 to 1, with the proviso that a quantity (b+c+d+e)=1. One of skill in the art understands how such M, D, T, and Q units and their molar fractions influence subscript a in the average formula above. T units (indicated by subscript d), Q units (indicated by subscript e) or both, are typically present in polyorganosiloxane resins, whereas D units, indicated by subscript c, are typically present in polyorganosiloxane polymers (and may also be present in polyorganosiloxane resins or branched polyorganosiloxanes).

Alternatively, starting material (i) may comprise a polyorganosiloxane that is substantially linear, alternatively is linear. Alternatively, the substantially linear polyorganosiloxane may have the average formula: $R^{13}_{a'} SiO_{(4-a')/2}$, where each $R^{13}$ and is as defined above, and where subscript a' is selected such that $1.9 \leq a' \leq 2.2$.

Alternatively, at RT, the substantially linear polyorganosiloxane may be a flowable liquid or may have the form of an uncured rubber. The substantially linear polyorganosiloxane may have a viscosity of 10 mPa·s to 30,000,000 mPa·s, alternatively 10 mPa·s to 10,000 mPa·s, alternatively 100 mPa·s to 1,000,000 mPa·s, and alternatively 100 mPa·s to 100,000 mPa·s at 25° C. Viscosity may be measured at RT via a Brookfield LV DV-E viscometer with a spindle selected as appropriate to the viscosity of the substantially linear polyorganosiloxane, i.e., RV-1 to RV-7.

Alternatively, when (ii) the polyorganosiloxane is substantially linear or linear, the polyorganosiloxane may have the average unit formula: $(R^{10}R^9_2 SiO_{1/2})_{aa}(R^{10}R^9 SiO_{2/2})_{bb}(R^{10}_2 SiO_{2/2})_{cc}(R^9_3 SiO_{1/2})_{dd}$, where each $R^9$ is an independently selected monovalent hydrocarbon group that is free of aliphatic unsaturation or a monovalent halogenated hydrocarbon group that is free of aliphatic unsaturation; each $R^{10}$ is independently selected from the group consisting of alkenyl and alkynyl; subscript aa is 0, 1, or 2, subscript bb is 0 or more, subscript cc is 1 or more, subscript dd is 0, 1, or 2, with the provisos that a quantity (aa+dd) 2, and (aa+dd)=2, with the proviso that a quantity (aa+bb+cc+dd) is 3 to 2,000. Alternatively, subscript cc≥0. Alternatively, subscript bb≥2. Alternatively, the quantity (aa+dd) is 2 to 10, alternatively 2 to 8, and alternatively 2 to 6. Alternatively, subscript cc is 0 to 1,000, alternatively 1 to 500, and alternatively 1 to 200. Alternatively, subscript bb is 2 to 500, alternatively 2 to 200, and alternatively 2 to 100.

The monovalent hydrocarbon group for $R^9$ is exemplified by an alkyl group of 1 to 6 carbon atoms, an aryl group of 6 to 10 carbon atoms, a halogenated alkyl group of 1 to 6 carbon atoms, a halogenated aryl group of 6 to 10 carbon atoms, an aralkyl group of 7 to 12 carbon atoms or a halogenated aralkyl group of 7 to 12 carbon atoms, where alkyl, aryl, and halogenated alkyl are as described herein. Alternatively, each $R^9$ is independently a monovalent hydrocarbon group free of aliphatic unsaturation. Alternatively, each $R^9$ is an alkyl group. Alternatively, each $R^9$ is independently methyl, ethyl or propyl. Each instance of $R^9$ may be the same or different. Alternatively, each $R^9$ is a methyl group.

The aliphatically unsaturated monovalent hydrocarbon group for $R^{10}$ is capable of undergoing hydrosilylation reaction. Suitable aliphatically unsaturated hydrocarbon groups for $R^{10}$ are exemplified by an alkenyl group as defined herein and exemplified by vinyl, allyl, butenyl, and hexenyl; and alkynyl groups as defined herein and exemplified by ethynyl and propynyl. Alternatively, each $R^{10}$ may be vinyl or hexenyl. Alternatively, each $R^{10}$ is a vinyl group. The subscripts in the unit formula for (ii-I) above may have values sufficient that the alkenyl or alkynyl content of the branched siloxane for (ii-I) may be 0.1% to 1%, alternatively 0.2% to 0.5%, based on the weight of branched siloxane (ii-I).

When (ii) the polyorganosiloxane is substantially linear, alternatively is linear, the at least two aliphatically unsaturated groups may be bonded to silicon atoms in pendent positions, terminal positions, or in both pendent and terminal locations. As a specific example of the polyorganosiloxane having pendant silicon-bonded aliphatically unsaturated groups, starting material A) may have the average unit formula: $[(CH_3)_3 SiO_{1/2}]_2 [(CH_3)_2 SiO_{2/2}]_{cc} [(CH_3) ViSiO_{2/2}]_{bb}$, where subscripts bb and cc are defined above, and Vi indicates a vinyl group. With regard to this average formula, any methyl group may be replaced with a different monovalent hydrocarbon group (such as alkyl or aryl), and any vinyl group may be replaced with a different aliphatically unsaturated monovalent hydrocarbon group (such as allyl or hexenyl). Alternatively, as a specific example of the polyorganosiloxane having an average, per molecule, of at least two silicon-bonded aliphatically unsaturated groups, starting material (ii) may have the average formula: $Vi(CH_3)_2 SiO[(CH_3)_2 SiO]_{cc} Si(CH_3)_2 Vi$, where subscript cc and Vi are defined above. The dimethyl polysiloxane terminated with silicon-bonded vinyl groups may be used alone or in combination with the dimethyl, methyl-vinyl polysiloxane disclosed immediately above. With regard to this average formula, any methyl group may be replaced with a different monovalent hydrocarbon group, and any vinyl group may be replaced with any terminally aliphatically unsaturated monovalent hydrocarbon group. Because the at least two silicon-bonded aliphatically unsaturated groups may be both pendent and terminal, (ii) the polyorganosiloxane may alternatively have the average unit formula: $[Vi(CH_3)_2 SiO_{1/2}]_2 [(CH_3)_2 SiO_{2/2}]_{cc} [(CH_3) ViSiO_{2/2}]_{bb}$, where subscripts bb and cc and Vi are defined above.

The substantially linear polyorganosiloxane can be exemplified by a dimethylpolysiloxane capped at both molecular terminals with dimethylvinylsiloxy groups, a methylphenylpolysiloxane capped at both molecular terminals with dimethylvinylsiloxy groups, a copolymer of a methylphenylsiloxane and dimethylsiloxane capped at both molecular terminals with dimethylvinylsiloxy groups, a copolymer of a methylvinylsiloxane and a methylphenylsiloxane capped at both molecular terminals with dimethylvinylsiloxy groups, a copolymer of a methylvinylsiloxane and diphenylsiloxane capped at both molecular terminals with dimethylvinylsiloxy groups, a copolymer of a methylvinylsiloxane, methylphenylsiloxane, and dimethylsiloxane capped at both molecular terminals with dimethylvinylsiloxy groups, a copolymer of a methylvinylsiloxane and a methylphenylsiloxane capped at both molecular terminals with trimethylsiloxy groups, a copolymer of a methylvinylsiloxane and diphenylsiloxane capped at both molecular terminals with trimethylsiloxy groups, and a copolymer of a methylvinylsiloxane, methylphenylsiloxane, and a dimethylsiloxane capped at both molecular terminals with trimethylsiloxy groups.

Alternatively, starting material (ii) may comprise a substantially linear, alternatively linear, polyorganosiloxane selected from the group consisting of:
i) dimethylvinylsiloxy-terminated polydimethylsiloxane,
ii) dimethylvinylsiloxy-terminated poly(dimethylsiloxane/methylvinylsiloxane),
iii) dimethylvinylsiloxy-terminated polymethylvinylsiloxane,
iv) trimethylsiloxy-terminated poly(dimethylsiloxane/methylvinylsiloxane),
v) trimethylsiloxy-terminated polymethylvinylsiloxane,
vi) dimethylvinylsiloxy-terminated poly(dimethylsiloxane/methylvinylsiloxane),
vii) dimethylvinylsiloxy-terminated poly(dimethylsiloxane/methylphenylsiloxane),
viii) dimethylvinylsiloxy-terminated poly(dimethylsiloxane/diphenylsiloxane),
ix) phenyl,methyl,vinyl-siloxy-terminated polydimethylsiloxane,
x) dimethylhexenylsiloxy-terminated polydimethylsiloxane,
xi) dimethylhexenylsiloxy-terminated poly(dimethylsiloxane/methylhexenylsiloxane),
xii) dimethylhexenylsiloxy-terminated polymethylhexenylsiloxane,
xiii) trimethylsiloxy-terminated poly(dimethylsiloxane/methylhexenylsiloxane),
xiv) trimethylsiloxy-terminated polymethylhexenylsiloxane
xv) dimethylhexenyl-siloxy terminated poly(dimethylsiloxane/methylhexenylsiloxane),
xvi) dimethylvinylsiloxy-terminated poly(dimethylsiloxane/methylhexenylsiloxane), and
xvii) a combination thereof.

Alternatively, A) the polyorganosiloxane may be a resinous polyorganosiloxane. The resinous polyorganosiloxane may have the average formula: $R^{13}_{a''}\text{—}SiO_{(4-a'')/2}$, where each $R^{13}$ is as defined above, and where subscript a'' is selected such that $0.5 \leq a'' \leq 1.7$.

The resinous polyorganosiloxane has a branched or a three dimensional network molecular structure. At 25° C., the resinous polyorganosiloxane may be in a liquid or in a solid form. Alternatively, the resinous polyorganosiloxane may be exemplified by a polyorganosiloxane that comprises only T units, a polyorganosiloxane that comprises T units in combination with other siloxy units (e.g., M, D, and/or Q siloxy units), or a polyorganosiloxane comprising Q units in combination with other siloxy units (i.e., M, D, and/or T siloxy units). Typically, the resinous polyorganosiloxane comprises T and/or Q units. Specific example of the resinous polyorganosiloxane include a vinyl-terminated silsesquioxane and a vinyl terminated MDQ resin.

Alternatively, starting material (ii) may comprise (ii-I) a branched siloxane, (ii-II) a silsesquioxane or both (ii-I) and (ii-II). Starting materials (ii-I) and (ii-II) may be particularly useful when the composition will be used for release coating applications.

Starting material (ii) may be a combination of the (ii-I) branched siloxane and (ii-II) the silsesquioxane. The combination may be a physical blend or mixture. The branched siloxane and the silsesquioxane are present in amounts relative to one another such that the amount of (ii-I) the branched siloxane and the amount of (ii-II) the silsesquioxane combined total 100 weight parts, based on combined weights of all starting materials in the release coating composition. The branched siloxane may be present in an amount of 50 to 100 parts by weight, and the silsesquioxane may be present in an amount of 0 to 50 parts by weight. Alternatively, the branched siloxane may be present in an amount 50 to 90 parts by weight and the silsesquioxane may be present in an amount of 10 to 50 parts by weight. Alternatively, the branched siloxane may be present in an amount of 50 to 80 parts by weight and the silsesquioxane may be present in an amount of 20 to 50 parts by weight. Alternatively, the branched siloxane may be present in an amount of 50 to 76 parts by weight and the silsesquioxane may be present in an amount of 24 to 50 parts by weight. Alternatively, the branched siloxane may be present in an amount of 50 to 70 parts by weight and the silsesquioxane may be present in an amount of 30 to 50 parts by weight. Without wishing to be bound by theory, it is thought that if the amount of silsesquioxane (ii-II) exceeds 50 weight parts, per 100 weight parts the combined amounts of (ii-I) the branched siloxane and (ii-II) the silsesquioxane, the release coating formed from the composition may suffer from the drawback of migration, where silsesquioxane can migrate and contaminate an adherend such as a pressure sensitive adhesive in contact with the release coating.

Starting material (ii-I) the branched siloxane may have unit formula (ii-I): $(R^9_3SiO_{1/2})_p(R^{10}R^9_2SiO_{1/2})_q(R^9_2SiO_{2/2})_r(SiO_{4/2})_s$, where each $R^9$ is independently a monovalent hydrocarbon group free of aliphatic unsaturation or a monovalent halogenated hydrocarbon group free of aliphatic unsaturation and each $R^{10}$ is an alkenyl group or an alkynyl group, both of which are as described above, subscript p 0, subscript q>0, 15≥r≥995, and subscript s is >0.

In the unit formula for (ii-I), subscript p≥0. Subscript q>0. Alternatively, subscript q≥3. Subscript r is 15 to 995. Subscript s is >0. Alternatively, subscript s≥1. Alternatively, for subscript p: 22≥p≥0; alternatively 20≥p≥0; alternatively 15≥p≥0; alternatively 10≥p≥0; and alternatively 5≥p≥0. Alternatively, for subscript q: 22≥q>0; alternatively 22≥q≥4; alternatively 20≥q>0; alternatively 15≥q>1; alternatively 10≥q≥2; and alternatively 15≥q≥4. Alternatively, for subscript r: 800≥r≥15; and alternatively 400≥r≥15. Alternatively, for subscript s: 10≥s>0; alternatively, 10≥s≥1; alternatively 5≥s>0; and alternatively s=1. Alternatively, subscript s is 1 or 2. Alternatively, when subscript s=1, subscript p may be 0 and subscript q may be 4.

The branched siloxane may contain at least two polydiorganosiloxane chains of formula $(R^9_2SiO_{2/2})_m$, where each subscript m is independently 2 to 100. Alternatively, the branched siloxane may comprise at least one unit of formula $(SiO_{4/2})$ bonded to four polydiorganosiloxane chains of formula $(R^9_2SiO_{2/2})_o$, where each subscript o is independently 1 to 100. Alternatively, the branched siloxane may have formula:

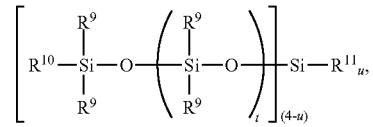

where subscript u is 0 or 1, each subscript t is independently 0 to 995, alternatively 15 to 995, and alternatively 0 to 100; each $R^{11}$ is an independently selected monovalent hydrocarbon group, each $R^9$ is an independently selected monovalent hydrocarbon group that is free of aliphatic unsaturation or a monovalent halogenated hydrocarbon group that is free of aliphatic unsaturation as described above, and each $R^{10}$ is independently selected from the group consisting of alkenyl and alkynyl as described above. Suitable branched siloxanes for starting material (ii-I) are exemplified by those disclosed in U.S. Pat. No. 6,806,339 and U.S. Patent Publication 2007/0289495.

The silsesquioxane has unit formula (ii-II): $(R^9_3SiO_{1/2})_f(R^{10}R^9_2SiO_{1/2})_f(R^9_2SiO_{2/2})_g(R^9SiO_{3/2})_h$, where $R^9$ and $R^{10}$ are as described above, subscript i≥0, subscript f>0, subscript g is 15 to 995, and subscript h>0. Subscript i may be 0 to 10. Alternatively, for subscript i: 12≥i≥0; alternatively 10≥i≥0; alternatively 7≥i≥0; alternatively 5≥i≥0; and alternatively 3≥i≥0.

Alternatively, subscript f≥1. Alternatively, subscript f≥3. Alternatively, for subscript f: 12≥f>0; alternatively 12≥f≥3; alternatively 10≥f>0; alternatively 7≥f>1; alternatively 5≥f≥2; and alternatively 7≥f≥3. Alternatively, for subscript g: 800≥g≥15; and alternatively 400≥g≥15. Alternatively, subscript h≥1. Alternatively, subscript h is 1 to 10. Alternatively, for subscript h: 10≥h>0; alternatively 5≥h>0; and alternatively h=1. Alternatively, subscript h is 1 to 10, alternatively subscript h is 1 or 2. Alternatively, when subscript h=1, then subscript f may be 3 and subscript i may be 0. The values for subscript f may be sufficient to provide the silsesquioxane of unit formula (ii-II) with an alkenyl content of 0.1% to 1%, alternatively 0.2% to 0.6%, based on the weight of the silsesquioxane. Suitable silsesquioxanes for starting material (ii) are exemplified by those disclosed in U.S. Pat. No. 4,374,967.

Starting material (ii) may comprise a combination or two or more different polyorganosiloxanes that differ in at least one property such as structure, molecular weight, monovalent groups bonded to silicon atoms and content of aliphatically unsaturated groups. The release coating composition may contain 60% to 98%, alternatively 60% to 95% of starting material (ii), based on combined weights of all starting materials in the release coating composition.

Starting Material (iii) Hydrosilylation Reaction Catalyst

The hydrosilylation reaction catalyst used as starting material (iii) in the release coating composition may be as described and exemplified above for starting material b). Alternatively, the hydrosilylation reaction catalyst for use in the release coating composition may be selected from the group consisting of Karstedt's catalyst and Ashby's catalyst. The (iii) hydrosilylation-reaction catalyst is present in the release coating composition in a catalytic amount, i.e., an amount or quantity sufficient to promote curing thereof at desired conditions. The catalytic amount of the (iii) hydrosilylation reaction catalyst may be >0.01 ppm to 10,000 ppm; alternatively >1,000 ppm to 5,000 ppm. Alternatively, the typical catalytic amount of (iii) the hydrosilylation reaction catalyst is 0.1 ppm to 5,000 ppm, alternatively 1 ppm to 2,000 ppm, alternatively >0 to 1,000 ppm. Alternatively, the catalytic amount of the (iii) hydrosilylation reaction catalyst may be 0.01 ppm to 1,000 ppm, alternatively 0.01 ppm to 100 ppm, alternatively 20 ppm to 200 ppm, and alternatively 0.01 ppm to 50 ppm of platinum group metal; based on combined weights of all starting materials in the release coating composition.

Starting Material (iv) Hydrosilylation Reaction Inhibitor

Starting material (iv) is an inhibitor that may be used for altering the reaction rate of the release coating composition, as compared to a composition containing the same starting materials but with the inhibitor omitted. Inhibitors for hydrosilylation curable compositions are exemplified by acetylenic alcohols such as methyl butynol, ethynyl cyclohexanol, dimethyl hexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol, and a combination thereof; cycloalkenylsiloxanes such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination thereof; ene-yne compounds such as 3-methyl-3-penten-1-yne, 3,5-dimethyl-3-hexen-1-yne; triazoles such as benzotriazole; phosphines; mercaptans; hydrazines; amines, such as tetramethyl ethylenediamine, dialkyl fumarates, dialkenyl fumarates, dialkoxyalkyl fumarates, maleates such as diallyl maleate; nitriles; ethers; carbon monoxide; alkenes such as cyclooctadiene, divinyltetramethyldisiloxane; alcohols such as benzyl alcohol; and a combination thereof. Alternatively, the hydrosilylation reaction inhibitor may be selected from the group consisting of acetylenic alcohols (e.g., 1-ethynyl-1-cyclohexanol) and maleates (e.g., diallyl maleate, bis maleate, or n-propyl maleate) and a combination of two or more thereof.

Alternatively, starting material (iv) in the composition may be a silylated acetylenic compound. Without wishing to be bound by theory, it is thought that adding a silylated acetylenic compound reduces yellowing of the reaction product prepared from hydrosilylation reaction of the composition as compared to a reaction product from hydrosilylation of a composition that does not contain a silylated acetylenic compound or that contains an organic acetylenic alcohol inhibitor, such as those described above.

The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy) dimethylsilane, bis(3-methyl-1-butyn-3-oxy)silanemethylvinylsilane, bis((1,1-dimethyl-2-propynyl)oxy) dimethylsilane, methyl(tris(1,1-dimethyl-2-propynyloxy)) silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy) trimethylsilane, (3-phenyl-1-butyn-3-oxy) diphenylmethylsilane, (3-phenyl-1-butyn-3-oxy) dimethylphenylsilane, (3-phenyl-1-butyn-3-oxy) dimethylvinylsilane, (3-phenyl-1-butyn-3-oxy) dimethylhexenylsilane, (cyclohexyl-1-ethyn-1-oxy) dimethylhexenylsilane, (cyclohexyl-1-ethyn-1-oxy) dimethylvinylsilane, (cyclohexyl-1-ethyn-1-oxy) diphenylmethylsilane, (cyclohexyl-1-ethyn-1-oxy) trimethylsilane, and combinations thereof. Alternatively, starting material (iv) is exemplified by methyl(tris(1,1-dimethyl-2-propynyloxy))silane, ((1,1-dimethyl-2-propynyl) oxy)trimethylsilane, or a combination thereof. The silylated acetylenic compound useful as starting material (iv) may be prepared by methods known in the art, such as silylating an acetylenic alcohol described above by reacting it with a chlorosilane in the presence of an acid receptor.

The amount of inhibitor added to the release coating composition will depend on various factors including the desired pot life of the composition, whether the composition will be a one part composition or a multiple part composition, the particular inhibitor used, and the selection and amount of starting materials (i) and (ii). However, when present, the amount of inhibitor may be 0% to 1%, alternatively 0% to 5%, alternatively 0.001% to 1%, alternatively 0.01% to 0.5%, and alternatively 0.0025% to 0.025%, based on combined weights of all starting materials in the composition.

Additional Starting Materials

The release coating composition may optionally further comprise one or more additional starting materials selected from: (v) an anchorage additive, (vi) an anti-mist additive, (vii) a release modifier, (viii) a substantially linear or linear polyorganohydrogensiloxane, and (ix) a solvent, such as that described above for starting material D).

(v) Anchorage Additive

Starting material (v) is an anchorage additive. Suitable anchorage additives are exemplified by a reaction product of a vinyl alkoxysilane and an epoxy-functional alkoxysilane; a reaction product of a vinyl acetoxysilane and epoxy-functional alkoxysilane; and a combination (e.g., physical blend and/or a reaction product) of a polyorganosiloxane having at least one aliphatically unsaturated hydrocarbon group and at least one hydrolyzable group per molecule and an epoxy-functional alkoxysilane (e.g., a combination of a hydroxy-terminated, vinyl functional polydimethylsiloxane with glycidoxypropyltrimethoxysilane). Alternatively, the anchorage additive may comprise a polyorganosilicate resin. Suitable anchorage additives and methods for their preparation are disclosed, for example, in U.S. Pat. No. 9,562,149;

U.S. Patent Application Publication Numbers 2003/0088042, 2004/0254274, and 2005/0038188; and European Patent 0 556 023. The exact amount of anchorage additive depends on various factors including the type of substrate and whether a primer is used, however, the amount of anchorage additive in the release coating composition may be 0 to 2 parts by weight, per 100 parts by weight of starting material (ii). Alternatively, the amount of anchorage additive, may be 0.01 to 2 parts by weight, per 100 parts by weight of starting material (ii).

(vi) Anti-Mist Additive

Starting material (vi) is an anti-mist additive that may be added to the release coating composition to reduce or suppress silicone mist formation in coating processes, particularly with high speed coating equipment. The anti-mist additive may be a reaction product of an organohydrogensilicon compound, an oxyalkylene compound or an organoalkenylsiloxane with at least three silicon bonded alkenyl groups per molecule, and a suitable catalyst. Suitable anti-mist additives are disclosed, for example, in U.S. Patent Application 2011/0287267; U.S. Pat. Nos. 8,722,153; 6,586,535; and 5,625,023.

The amount of anti-mist additive will depend on various factors including the amount and type of other starting materials selected for the release coating composition. However, the amount of anti-mist additive may be 0% to 10%, alternatively 0.1% to 3%, based on combined weights of all starting materials in the release coating composition.

(vii) Release Modifier

Starting material (vii) is a release modifier that may be added to the release coating composition to control (decrease) the level of release force (the adhesive force between the release coating and an adherend thereto, such as a label including a pressure sensitive adhesive). Release coating compositions having the required release force can be formulated from a modifier-free release coating composition by adjusting the level of modifier. Examples of suitable release modifiers include trimethylsiloxy-terminated dimethyl, phenylmethylsiloxanes. Alternatively, the release modifier may be a condensation reaction product of an organopolysiloxane resin having hydroxyl or alkoxy groups and a diorganopolysiloxane with at least one hydroxyl or hydrolyzable group. If used, a release modifier can, for example, be used at 0 to 85 parts by weight, alternatively 25 to 85 parts, per 100 parts of starting material (ii). Examples of suitable release modifiers are disclosed, for example, in U.S. Pat. No. 8,933,177 and U.S. Patent Application Publication 2016/0053056.

(viii) Linear Polyorganohydrogensiloxane

Starting material (viii) is a substantially linear, alternatively linear, polyorganohydrogensiloxane distinct from starting material (i), which may be added as an additional crosslinker to the release coating composition. The substantially linear or linear polyorganohydrogensiloxane has unit formula: $(HR^{12}_2SiO_{1/2})_{v'}(HR^{12}SiO_{2/2})_{w'}(R^{12}_2SiO_{2/2})_{x'}(R^{12}_3SiO_{1/2})_{y'}$, where each $R^{12}$ is an independently selected monovalent hydrocarbon group, subscript v' is 0, 1, or 2, subscript w' is 1 or more, subscript x' is 0 or more, subscript y' is 0, 1, or 2, with the provisos that a quantity (v'+y')=2, and a quantity (v'+w') 3. The monovalent hydrocarbon group for $R^{12}$ may be as described above for the monovalent hydrocarbon group for $R^1$. A quantity (v'+w'+x'+y') may be 2 to 1,000. The polyorganohydrogensiloxane is exemplified by:
i) dimethylhydrogensiloxy-terminated poly(dimethyl/methylhydrogen)siloxane copolymer,
ii) dimethylhydrogensiloxy-terminated polymethylhydrogensiloxane,
iii) trimethylsiloxy-terminated poly(dimethyl/methylhydrogen)siloxane copolymer, and
iv) trimethylsiloxy-terminated polymethylhydrogensiloxane, and v) a combination of two or more of i), ii), iii), iv), and v). Suitable polyorganohydrogensiloxanes are commercially available from Dow Silicones Corporation of Midland, Mich., USA.

(ix) Solvent

Starting material (x) is a solvent. Suitable solvents include the hydrocarbons described above as starting material D) in the method for making the polyfunctional organohydrogensiloxane. Alternatively, the solvent may be selected from polyalkylsiloxanes, alcohols, ketones, glycol ethers, tetrahydrofuran, mineral spirits, naphtha, tetrahydrofuran, mineral spirits, or a combination thereof. Polyalkylsiloxanes with suitable vapor pressures may be used as the solvent, and these include hexamethyldisiloxane, octamethyltrisiloxane, hexamethylcyclotrisiloxane and other low molecular weight polyalkylsiloxanes, such as 0.5 to 1.5 cSt DOWSIL™ 200 Fluids and DOWSIL™ OS FLUIDS, which are commercially available from Dow Silicones Corporation of Midland, Mich., U.S.A.

Alternatively, starting material (x) may comprise an organic solvent. The organic solvent can be an alcohol such as methanol, ethanol, isopropanol, butanol, or n-propanol; a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, tetrahydrofuran; mineral spirits; naphtha; or a combination thereof.

The amount of solvent will depend on various factors including the type of solvent selected and the amount and type of other starting materials selected for the release coating composition. However, the amount of solvent may be 0% to 99%, alternatively 2% to 50%, based on the weight of all starting materials in the release coating composition. The solvent may be added during preparation of the release coating composition, for example, to aid mixing and delivery. All or a portion of the solvent may optionally be removed after the release coating composition is prepared.

Other optional starting materials which may also be added to release coating compositions described herein include, for example, reactive diluents, fragrances, preservatives colorants, and fillers, for example, silica, quartz or chalk.

When selecting starting materials for the release coating composition (and other curable compositions described herein), there may be overlap between types of starting materials because certain starting materials described herein may have more than one function. Certain particulates may be useful as fillers and as colorants such as pigments, and even as flame retardants, e.g., carbon black. When adding additional starting materials to the release coating composition, the additional starting materials are distinct from starting materials (i) to (iv) and from one another.

Alternatively, the release coating may be free of particulates or contains only a limited amount of particulate (e.g., filler and/or pigment), such as 0 to 30% by weight of the release coating composition. Particulates can agglomerate or otherwise stick to the coater equipment used to apply the release coating. They can hinder optical properties, for example transparency, of the release coating and of the release liner formed therewith, if optical transparency is desired. The particulates may be prejudicial to the adherence of an adherend.

Alternatively, the release coating composition of the invention may be free from fluoroorganosilicone compounds. It is believed that, during the cure, a fluoro compound, because of its low surface tension, may rapidly migrate to the interface of a coating composition and a substrate, for example a polyorganosiloxane release coating composition/PET film interface, and prevent adherence of the release coating (prepared by curing the release coating composition) to the substrate by making a fluorine containing barrier. By making a barrier, the fluoro compound may prevents any starting material from reacting at the interface. Moreover, fluorosilicone compounds are usually expensive.

The release composition may be prepared by combining starting materials comprising (i), (ii), (iii) and (iv), described above, along with any optional additional starting materials, in any order of addition, optionally with a master batch, and optionally under shear.

Method for Coating a Substrate

A method of preparing a coated substrate with the curable composition comprises disposing the curable composition on the substrate. The method further comprises curing the curable composition on the substrate. Curing may be performed by heating at an elevated temperature, e.g., 50° C. to 180° C., alternatively 50° C. to 120° C., and alternatively 50° C. to 90° C. to give the coated substrate. One skilled in the art would be able to select an appropriate temperature depending on various factors including the selection of optional starting materials in the curable composition and the substrate material of construction.

The curable composition may be disposed or dispensed on the substrate in any suitable manner. Typically, the curable composition is applied in wet form via a wet coating technique. The curable composition may be applied by i) spin coating; ii) brush coating; iii) drop coating; iv) spray coating; v) dip coating; vi) roll coating; vii) flow coating; viii) slot coating; ix) gravure coating; x) Meyer bar coating; or xi) a combination of any two or more of i) to x). Typically, disposing the curable composition on the substrate results in a wet deposit on the substrate, which is subsequently cured to give the coated substrate, which comprises a cured film formed from the curable composition on the substrate.

The substrate is not limited and may be any substrate. The cured film may be separable from the substrate or may be physically and/or chemically bonded to the substrate depending on its selection. The substrate may have an integrated hot plate or an integrated or stand-alone furnace for curing the deposit. The substrate may optionally have a continuous or non-continuous shape, size, dimension, surface roughness, and other characteristics. Alternatively, the substrate may have a softening point temperature at the elevated temperature. However, the curable composition and method are not so limited.

Alternatively, the substrate may comprise a plastic, which maybe a thermosetting and/or thermoplastic. However, the substrate may alternatively be glass, metal, paper, wood, cardboard, paperboard, a silicone, or polymeric materials, or a combination thereof.

Specific examples of suitable substrates include paper substrates such as Kraft paper, polyethylene coated Kraft paper (PEK coated paper), and regular papers; polymeric substrates such polyamides (PA); polyesters such as polyethylene terephthalates (PET), polybutylene terephthalates (PET), polytrimethylene terephthalates (PTT), polyethylene naphthalates (PEN), and liquid crystalline polyesters; polyolefins such as polyethylenes (PE), polypropylenes (PP), and polybutylenes; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones; polyvinyl alcohols (PVA); polyetheretherketones (PEEK); polyetherketoneketones (PEKK); polyarylates (PAR); polyethernitriles (PEN); phenolic resins; phenoxy resins; celluloses such as triacetylcellulose, diacetylcellulose, and cellophane; fluorinated resins, such as polytetrafluoroethylenes; thermoplastic elastomers, such as polystyrene types, polyolefin types, polyurethane types, polyester types, polyamide types, polybutadiene types, polyisoprene types, and fluoro types; and copolymers, and combinations thereof.

The curable composition, or wet deposit, is typically cured at the elevated temperature for a period of time. The period of time is typically sufficient to effect curing, i.e., cross-linking, of the curable composition. The period of time may be greater than 0 to 8 hours, alternatively greater than 0 to 2 hours, alternatively greater than 0 to 1 hour, alternatively greater than 0 to 30 minutes, alternatively greater than 0 to 15 minutes, alternatively greater than 0 to 10 minutes, alternatively greater than 0 to 5 minutes, alternatively greater than 0 to 2 minutes. The period of time depends on various factors including on the elevated temperature is utilized, the temperature selected, desired film thickness, and the presence of absence of any water or carrier vehicle in the curable composition.

Curing the curable composition typically has a dwell time of 0.1 second and 50 seconds; alternatively 1 second to 10 seconds; and alternatively 0.5 second to 30 seconds. Dwell time selected may depend on the substrate selection, temperature selected, and line speed. Dwell time, as used herein, refers to the time during which the curable composition, or wet deposit, is subjected to the elevated temperature. Dwell time is distinguished from cure time, as there may be ongoing curing even after the curable composition, wet deposit, or partially cured reaction intermediary thereof is no longer subjected to the elevated temperature, which typically initiates curing. Alternatively, the coated article may be prepared on a conveyor belt in an oven, and the dwell time may be calculated by dividing a length of the oven (e.g. in meters) by a line speed of the conveyor belt (e.g. in meters/sec).

The period of time may be broken down into cure iterations, e.g. a first-cure and a post-cure, with the first-cure being, for example, one hour and the post cure being, for example, three hours. The elevated temperature may be independently selected from any temperature above room temperature in such iterations, and may be the same in each iteration.

Depending on a thickness and other dimensions of the film and coated substrate, the coated substrate can be formed via an iterative process. For example, a first deposit may be formed and subjected to a first elevated temperature for a first period of time to give a partially cured deposit. Then, a second deposit may be disposed on the partially cured deposit and subjected to a second elevated temperature for a second period of time to give a second partially cured deposit. The partially cured deposit will also further cure during exposure to the second elevated temperature for the second period of time. A third deposit may be disposed on the second partially cured deposit and subjected to a third elevated temperature for a third period of time to give a third partially cured deposit. The second partially cured deposit will also further cure during exposure to the second elevated temperature for the second period of time. This process may be repeated, for example, from 1 to 50 times, to build the coated article as desired. A composite is of partially cured layers may be subjected to a final post-cure, e.g. at the elevated temperature and period of time above. Each elevated temperature and period of time may be independently selected and may be the same as or different from one another. When the article is formed via the iterative process, each deposit may also be independently selected and may differ in terms of starting materials selected in the curable composition, their amounts, or both. Alternatively still, each iterative layer may be fully cured, rather than only being partially cured, in such an iterative process.

Alternatively, the deposit may comprise a wet film. Alternatively, the iterative process may be wet-on-wet, depending on a cure state of the partially cured layer. Alternatively, the iterative process may be wet-on-dry.

The coated substrate, which comprises the film formed from the curable composition on the substrate, may have varying dimensions, including relative thicknesses of the film and the substrate. The film has a thickness that may vary depending upon its end use application. The film may have a thickness of greater than 0 to 4,000 µm, alternatively greater than 0 to 3,000 µm, alternatively greater than 0 to 2,000 µm, alternatively greater than 0 to 1,000 µm, alternatively greater than 0 to 500 µm, and alternatively greater than 0 to 250 µm. However, other thicknesses are contemplated, e.g. 0.1 to 200 µm. For example, the thickness of the film may be 0.2 to 175 µm; alternatively 0.5 to 150 µm; alternatively 0.75 to 100 µm; alternatively 1 to 75 µm; alternatively 2 to 60 µm; alternatively 3 to 50 µm; and alternatively 4 to 40 µm. Alternatively, when the substrate is plastic, the film may have a thickness of greater than 0 to 200, alternatively greater than 0 to 150, and alternatively greater than 0 to 100 µm.

If desired, the film may be subjected to further processing depending upon its end use application. For example, the film may be subjected to oxide deposition (e.g. $SiO_2$ deposition), resist deposition and patterning, etching, chemical, corona, or plasma stripping, metallization, or metal deposition. Such further processing techniques are generally known. Such deposition may be chemical vapor deposition (including low-pressure chemical vapor deposition, plasma-enhanced chemical vapor deposition, and plasma-assisted chemical vapor deposition), physical vapor deposition, or other vacuum deposition techniques. Many such further processing techniques involve elevated temperatures, particularly vacuum deposition, for which the film is well suited in view of its excellent thermal stability. Depending on an end use of the film, however, the film may be utilized with such further processing.

The coated substrate may be utilized in diverse end use applications. For example, the coated substrate may be utilized in coating applications, packaging applications, adhesive applications, fiber applications, fabric or textile applications, construction applications, transportation applications, electronics applications, or electrical applications. However, the curable composition may be utilized in end use applications other than preparing the coated substrate, e.g. in the preparation of articles, such as silicone rubbers.

Alternatively, the coated substrate may be utilized as a release liner, e.g. for a tape or adhesive, including any pressure-sensitive adhesives, including acrylic resin-type pressure-sensitive adhesives, rubber-type pressure-sensitive adhesives, and silicone-type pressure-sensitive adhesives, as well as acrylic resin-type adhesives, synthetic rubber-type adhesives, silicone-type adhesives, epoxy resin-type adhesives, and polyurethane-type adhesives. Each major surface of the substrate may have a film disposed thereon for double sided tapes or adhesives.

Alternatively, when the curable composition will be formulated as a release coating composition, the release coating composition may be prepared by mixing the starting materials together, for example, to prepare a one part composition. However, it may be desirable to prepare a release coating composition as a multiple part composition, in which starting materials having SiH functionality (e.g., starting material (i), and when present (viii)) and hydrosilylation reaction catalyst are stored in separate parts, until the parts are combined at the time of use (e.g., shortly before application to a substrate).

For example, a multiple part composition may comprise:
Part (A) a base part comprising (ii) the polyorganosiloxane having an average, per molecule, of at least 2 silicon bonded aliphatically unsaturated hydrocarbon groups and iii) the hydrosilylation reaction catalyst, and when present, one or more of, the anchorage additive, and the solvent, and
Part (B) a curing agent part comprising (ii) the polyorganosiloxane having an average, per molecule, of at least 2 silicon bonded aliphatically unsaturated hydrocarbon groups and (i) the polyfunctional organohydrogensiloxane, and when present (viii) the substantially linear or linear polyorganohydrogensiloxane, the anchorage additive, the solvent. Starting material (iv), the inhibitor may be added to either Part (A), Part (B), or both. Part (A) and Part (B) may be combined in a weight ratio (A):(B) of 1:1 to 10:1, alternatively 1:1 to 5:1, and alternatively 1:1 to 2:1. Part (A) and Part (B) may be provided in a kit with instructions, e.g., for how to combine the parts to prepare the release coating composition, how to apply the release coating composition to a substrate, and how to cure the release coating composition.

Alternatively, when the anchorage additive is present, it can be incorporated in either of Part (A) or Part (B), or it can be added in a separate (third) part.

Alternatively, the release coating composition may be prepared by a method comprising:
1) mixing starting materials comprising (ii) the polyorganosiloxane having an average, per molecule, of at least 2 silicon bonded aliphatically unsaturated hydrocarbon groups, (i) the polyfunctional organohydrogensiloxane, (iii) the hydrosilylation reaction catalyst, (iv) the inhibitor, and optionally one or more of (v) the anchorage additive, (vi) the anti-mist additive, (vii) the controlled release agent, (viii) the linear polyorganohydrogensiloxane, and (ix) the solvent, thereby forming a release coating composition;
2) applying the mixture on a substrate. Step 1) may be performed by mixing Part (A) and Part (B) of a multiple part composition, as described above.

The release coating composition can for example be applied to the substrate by any convenient means such as spraying, doctor blade, dipping, screen printing or by a roll coater, e.g. an offset web coater, kiss coater or etched cylinder coater.

The release coating composition of the invention can be applied to any substrate, such as those described above. Alternatively, the release coating composition may be applied to polymer film substrates, for example polyester, particularly polyethylene terephthalate (PET), polyethylene, polypropylene, or polystyrene films. The release coating composition can alternatively be applied to a paper substrate, including plastic coated paper, for example paper coated with polyethylene, glassine, super calender paper, or clay coated kraft. The release coating composition can alternatively be applied to a metal foil substrate, for example aluminum foil.

The method may further comprise: 3) treating the substrate before coating the release coating composition on the substrate. Treating the substrate may be performed by any convenient means such as a plasma treatment or a corona discharge treatment. Alternatively, the substrate may be treated by applying a primer. In certain instances anchorage of the release coating may be improved if the substrate is treated before coating.

When the release coating composition includes a solvent, the method may further comprise: 4) removing solvent, which may be performed by any conventional means, such as heating at 50° C. to 100° C. for a time sufficient to remove all or a portion of the solvent. The method may further comprise 5) curing the release coating composition to form a release coating on a surface of the substrate. Curing may be performed by any conventional means such as heating at 100° C. to 200° C.

Under production coater conditions, cure can be effected in a residence time of 1 second to 6 seconds, alternatively 1.5 seconds to 3 seconds, at an air temperature of 120° C. to 150° C. Heating for steps 4) and/or 5) can be performed in an oven, e.g., an air circulation oven or tunnel furnace or by passing the coated film around heated cylinders.

EXAMPLES

These examples are intended to illustrate the invention and should not be interpreted as limiting the scope of the invention set forth in the claims. The starting materials in Table 1 were used in the examples herein.

TABLE 1

Starting Materials

| Name | Chemical Description | Supplier |
|---|---|---|
| MH-1109 | cyclic polymethylhydrogensiloxane mixture having DP = 4 to 6, crude (not purified after production) | Dow Silicones |
| MH-1109, stripped | cyclic polymethylhydrogensiloxane mixture having DP = 4 to 6, stripped (to remove impurities after production) | Dow Silicones |
| ETM Polymer | trimethoxysilylethyl-terminated polydimethylsiloxane, DP = 550 | Starting Material B) Reactant/available from Dow Silicones Corporation |
| BHT | Butylated hydroxytoluene | Free radical inhibitor available from Millipore Sigma |
| AMA | allyl methacrylate | Reactant available from Mitsui |
| ATMS | Allyltrimethoxysilane 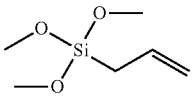 | Reactant available from Dow Silicones Corporation |
| 2-0707 | Platinum(0)-1,3-divinyl-1,1,3,3-tetramethyldisiloxane complex in PDMS, Pt concentration = 5,000 ppm | Hydrosilylation catalyst available from Dow Silicones Corporation |
| Diallyl maleate | Diallyl maleate | Pt chelator/quencher inhibitor available from Bimax Chemicals |
| $m^H_4Q$ | Tetrakis(dimethylsiloxy)silane | Gelest |
| BCF | Tris(pentafluorophenyl)borane | Millipore Sigma |
| Al2O3 | Activated Alumina, neutral | Millipore Sigma |
| Heptane | n-heptane | Millipore Sigma |
| MIBK | methyl isobutyl ketone | Millipore Sigma |
| Allyl Glycidyl Ether | allyl glycidyl ether | Millipore Sigma |
| MAC PDMS | Methacryloxypropyl-terminated polydimethylsiloxane, DP = 100-120 | Dual cure compound available from Dow Silicones Corporation |
| Filler | Fume silica | Filler TS-530 available from Cabot Corporation |
| ETM RESIN/POLYMER | Resin-polymer blend, with trimethoxysilyl functionalities | Reactive Resin Polymer Blend available from Dow Silicones Corporation |
| Z-6030 | Methacryloxypropyltrimethoxysilane | Dual cure compound Organosilicon compound with both hydrolysable group and free radical reactive group available from Dow Silicones Corporation |
| TAIC | Triallylisocyanurate | Adhesion promoter available from Acros |
| MBT | 2-mercaptobenzothiazole | Corrosion inhibitor available from Millipore Sigma or Acros or TCI |
| A186 (KBM-303) | Beta-(3,4-Epoxycyclohexyl)ethyltrimethoxysilane | Silquest A-186 Silane Adhesion promoter available from Momentive Performance Materials |
| TNBT (TnBT) | Tri-n-butyl titanate | Condensation reaction catalyst available from Dorf Ketal |
| IBTMS (Z-2306) | Isobutyltrimethoxysilane | Drying agent and crosslinker available from Dow Silicones Corporation |
| APTMS (A1110) | 3-Aminopropyltrimethoxysilane | Adhesion promoter available from Momentive Performance Materials |
| MDBP paste | methylbenzoyl peroxide | Free radical initiator available from United Initiators or Akzo Nobel |

TABLE 1-continued

Starting Materials

| Name | Chemical Description | Supplier |
|---|---|---|
| Branched Vinyl Polymer | A branched polydimethylsiloxane of formula Si{[OSi(CH$_3$)$_2$]$_v$—OSi(CH$_3$)$_2$CH=CH$_2$}$_4$ where subscript v is sufficient to provide the polydimethylsiloxane with a vinyl content of 0.9% and Mn = 12,300 Da. | Polymer available from Dow Silicones Corporation |
| ETCH | 1-Ethynyl-1-cyclohexanol | Inhibitor available from Millipore Sigma |
| 4000 catalyst | Karstedt's catalyst | Catalyst available from Dow Silicones Corporation |
| 7028 | trimethylsiloxy-terminated poly(methyl/hydrogen)siloxane | Crosslinker available from Dow Silicones Corporation |
| Filled Vi PDMS | A mixture of 70% of vinyl terminated polydimethylsiloxane with DP = 800-1000 and 30% fumed silica | Reactant available from Dow Silicones Corporation |
| Vi Terminated PDMS | Vinyl terminated polydimethylsiloxane, DP = 600-700 | Reactant available from Dow Silicones Corporation |
| ETS-900 aka OFS-1579 | Dimethyldiacetoxysilane: Diethyldiacetoxysilane = 50:50% wt | Reactant available from Dow Silicones Corporation |
| MTM, Z-6070 | Methyltrimethoxysilane | Drying agent and crosslinker available from Dow Silicones Corporation |
| Adhesion Promoter 1 | Trimethoxysilyl terminated polydimethylsiloxane, DP = 300-400 | Adhesion promoter available from Dow Silicones Corporation |
| Tinopal OB | 2,5-thiophenediylbis(5-tert-butyl-1,3-benzoxazole) | Fluorescent optical brightener available from BASF |
| BPO | benzoyl peroxide paste with tradename Perkadox L-50S-ps | Radical initiator commercially available from Akzo Nobel |
| OS-20 | Hexamethyldisiloxane | DOWSIL ™ OS-20 fluid available from Dow Silicones Corporation |

Comparative Example 1

Comparative adhesives 1 and 2 contained methacryloxypropyl-terminated linear PDMS, with different filler loadings, and were prepared as follows: To a mixer was added a methacryloxypropyl-terminated polydimethylsiloxane (MAC PDMS, 51.83 grams) and TS-530 fume silica. The mixture was stirred for 10 minutes. To the mixture was added ETM RESIN/POLYMER (14.90 grams), Z-6030 silane (1.54 grams), triallyl isocyanurate (0.39 grams), a solution of 2-mercaptobenzothiazole (0.12 grams) in Silquest A-186 silane (0.46 grams), a solution of tri-n-butyl titanate (0.47 grams) in Z-2306 (1.42 grams) and A1110 (0.09 gram) in Z-2306 (0.08 gram). The resulting preparation was mixed to homogeneity. Methylbenzoyl peroxide paste (2.24 grams) was added. The resulting preparation was mixed again for 10 minutes and was degassed under vacuum for 30 minutes to yield the comparative adhesives 1 and 2. Comparative adhesives 1 and 2 contained 6% and 9% fume silica, respectively.

Comparative Example 2

Comparative adhesive 3 (EA-7100), which was a commercially available adhesive containing a dumbbell-shaped polydimethylsiloxane crosslinker and 17% filler was prepared as follows: To a mixer was added Filled Vi PDMS (2897 grams), Vi Terminated PDMS (1636 grams), OS-20 fluid (271 grams), and ETS-900 (aka OFS-1579, 4.89 grams). The mixture was inerted using nitrogen purge and stirred for 10 minutes (dissolving blades=500 rpm; scraper blade=20 rpm). To the homogenized mixture was added butylated hydroxytoluene (1.4 grams), stripped MH-1109 (98.8 grams), and allyl methacrylate (233 grams). The mixture was stirred for an additional 10 minutes at room temperature (250 rpm; 20 rpm), at which point a platinum catalyst (2-0707, 6.4 grams) was added to the mixture. The mixture was stirred for 10 additional minutes (250 rpm; 20 rpm) before setting the temperature at 60° C. The temperature was held for 30 minutes at 60° C. before cooling, and diallyl maleate (6.4 grams) was added when temperature dipped below 50° C. The mixture was then cooled to less than 30° C. before adding MTM (Z-6070, 44.2 grams). The mixture was then heated to 60° C. and held for 30 minutes (250 rpm; 20 rpm), wherein the temperature was increased to 85° C. and a vacuum of 5-6 Torr was applied for 40 minutes. The dumbbell-shaped polydimethylsiloxane (PDMS) with methacryloxypropyl-groups was obtained as a white viscous paste.

In a mixer, the dumbbell-shaped PDMS with methacryloxypropyl-groups (2200 grams), ETM Resin/Polymer (593 grams), Adhesion Promoter 1 (3 grams), and Tinopal OB (0.61 gram) were loaded. The mixture was mixed for 10 minutes at 10° C. (200 rpm; 20 rpm). To the homogeneous mixture was added benzoyl peroxide paste (Perkadox L-50S-ps, 90.48 grams), Z-6030 silane (60.4 grams), triallyl isocyanurate (15 grams), and a solution of 2-mercaptobenzothiazole (4.6 grams) in A186 (aka KBM-303, 18.1 grams). The mixture was mixed again for 10 minutes at 10° C. (200 rpm; 20 rpm). Solutions of tri-n-butyl titanate (18.7 grams) in IBTMS (Z-2306, 56.7 grams) and A1110 (3.4 grams) in IBTMS (3.4 grams) were added. The prep was mixed again for 10 minutes at 10° C. (200 rpm; 20 rpm) and degassed at 10° C. at 200 Torr of vacuum for 30 minutes to afford the comparative adhesive 3.

Working Example 3—Preparation of Adhesive I

In a typical synthesis, 300.2 grams of $M^H{}_4Q$ and 200.4 grams of heptane were mixed in a 1 liter flask equipped with a mechanical stirrer, a thermal couple, and a Dean Stark adapted to a water cooled condenser with $N_2$ bubbler. Approximately 99 g of heptane was removed via azeotropic distillation at 112-119° C. Then the pot temperature was cooled to 33° C., and 2.3 mL of 5.4% BCF/toluene solution was added into the flask. 152.0 g of trimethoxysilylethyl-terminated polydimethylsiloxane (ETM Polymer) was added into the flask slowly. The pot temperature was maintained at 50-55° C. After 3 hours, heating was removed and 36.0 grams neutral activated alumina was added. The alumina was filtered out through a 0.45 μm filter membrane after stirring for 1.5 hours. Volatiles were removed via rotary evaporator (<1 mmHg) at 100° C. for 1.5 hours. The resulting polyfunctional organohydrogensiloxane, labelled G2Si—H, was recovered as a viscous fluid (148.5 g).

To a mixer was added G2Si—H (50.22 grams), butylated hydroxytoluene (20.0 milligrams), allyl methacrylate (12.08 grams), and allyltrimethoxysilane (0.84 gram). The mixture was homogenized with stirring for 10 minutes, at which point a platinum catalyst (2-0707, 64 milligrams) was added. The mixture was heated at 70° C. for an hour. The temperature of the mixture was allowed to cool down to 50° C., and diallyl maleate (110 milligrams) was added. Fume silica (TS-530, 4.08 grams) was added and the mixture was mixed thoroughly to yield clustered functional organosiloxane sample 1.

The clustered functional organosiloxane sample 1 prepared as described above (54.50 grams), ETM Resin/Polymer (14.91 grams), Z-6030 silane (1.52 grams), triallyl isocyanurate (0.38 grams), a solution of 2-mercaptobenzothiazole (0.12 grams) in Silquest A-186 silane (0.45 grams), a solution of tri-n-butyl titanate (0.50 grams) in Z-2306 (1.40 grams) and A1110 (0.08 gram) in Z-2306 (0.08 gram) were mixed to homogeneity. Methylbenzoyl peroxide paste (2.20 grams) was added. The resulting preparation was mixed again for 10 minutes and degassed under vacuum for 30 minutes to afford the adhesive I.

Working Example 4—Preparation of Polyfunctional Organohydrogensiloxane 99.8 grams of $M^H{}_4Q$ was mixed with 67 μL of BCF solution (5.6% BCF in toluene) in a 250 mL 4-neck flask equipped with a mechanical stirrer, a thermal couple, and an adapter to $N_2$ bubbler. A mixture of 15.3 grams of methyldimethoxy-terminated polydimethylsiloxane (with DP=14) and 0.39 grams of BCF solution (5.6% BCF in toluene) was added into the flask slowly in 28 minutes under vigorous stirring. The pot temperature was maintained at 10° C.-15° C. After 30 minutes, 5.5 grams of neutral activated alumina was added. The alumina was filtered out through a 0.45 μm filter membrane after stirring for 2 hours at RT. Volatiles were removed via rotary evaporator (<1 mmHg) at 100° C. for 1.5 hours. The resulting polyfunctional organohydrogensiloxane was recovered as a clear fluid.

Reference Example 5—Release Coating Composition Containing Additive Prepared According to Example 4

Release coating composition samples were prepared as follows. Branched Vinyl Polymer and an SiH functional compound (7028 or the additive prepared in Example 4, or a mixture thereof) were mixed at RT. ETCH was added and the resulting preparation was mixed well. 4000 Catalyst was then added. Amounts of each starting material in each sample are shown below in Table 3. Amounts shown are in grams.

TABLE 3

Release Coating Samples

| | Sample | | |
|---|---|---|---|
| Starting Material | F1 (W) | F2 (C) | F3 (W) |
| Branched Vinyl Polymer | 43.89 | 47.90 | 46.95 |
| ETCH | 0.04 | 0.04 | 0.04 |
| 4000 catalyst | 0.29 | 0.29 | 0.29 |
| Additive Prepared in Example 4 | 5.78 | 0 | 1.36 |
| 7028 Crosslinker | 0 | 1.78 | 1.36 |

The resulting release coating samples were coated on UPM Glassine paper using a handsheet coater. Samples were cured at 182° C. for 11s.

Reference Example 6—DSC

Coating bath reactivity of release coating compositions prepared according to Reference Example 5 was measured using DSC, using a TA DSC-Q200 apparatus. The testing method involved a 10° C./min ramping speed from 40° C. to 180° C. under $N_2$ protection. Without wishing to be bound by theory, it is thought that DSC provides indirect information about bath reactivity, i.e., lower peak temperature corresponds to higher bath reactivity. Generally, high bath reactivity, indicating fast cure, is desirable. Results are shown in Table 4. However, without wishing to be bound by theory, it is thought that the DSC results are not always correlated well to cure performance results generated by pilot coater trials due to the difference between DSC and cure performance test used by pilot coater trial: a. DSC monitors the reaction between SiH and Vinyl functional groups; it gives the reaction rate information. Extractable test (detailed procedure is shown below) tells how well the polyorganosiloxane network is formed within designed cure time (dwell time). It gives the information about polyorganosiloxane network formation speed. They are different tests in nature. b. DSC measures the cure reaction of closed system, while extractable measures the cure of a very thin film (on the order of 1 μm).

TABLE 4

DSC results.

| DSC results* | F1 (W) | F2 (C) | F3 (W) |
|---|---|---|---|
| Tpeak (° C.) | 63.1 | 115.6 | 104.8 |
| Delta H (J/g) | 31.3 | 44.8 | 40.8 |
| T95 (° C.) | 63.1 | 118.3 | 107.1 |

*Testing method: 10° C./min ramping speed from 40° C. to 180° C. under $N_2$ protection The DSC study demonstrated that the additive prepared in Example 4 was more reactive than commercially available 7028 crosslinker, which was reflected by much lower peak temperature (Tpeak) and 95 conversion temperature (T95). Sample F3 showed the addition of the additive of Example 4 in combination with the commercially available 7028 crosslinker improved the reactivity of the release coating composition.

Reference Example 7—Testing Procedure for Extractables

To measure the cure performance of the compositions, an extractable test was undertaken immediately after cure. The extractable test was utilized to identify the amount of non-crosslinked silicone that was extractable from a cured release-coated sample in the presence of a solvent. The test method used for the following example was as follows:

1. Immediately upon completion of the coating process (described above) three sample discs were cut from a coated substrate using a 1.375 inch (3.49 cm) die cutter.
2. The silicone coat weight on each sample was determined using an Oxford Instruments Lab-X 3500 Benchtop XRF analyzer
3. Each disc was then placed in an individual 100-mL bottle containing 40 mL of methyl isobutyl ketone solvent. Tweezers were used for handling sample discs at all times to ensure that the silicone surface of the sample was uncontaminated or damaged. The solvent bottles were then covered with lids and allowed to rest on the laboratory bench top for 30 minutes. After this period the discs were removed from the solvent and placed on clean tissue paper, with the silicone coated side up.
4. The solvent was allowed to evaporate from the sample discs without wiping or blotting the samples.
5. The final coat weight of each sample disc was then determined and.
6. The percent of extractable was calculated using the following formula:

$$\text{Extractable} = \frac{(W_i - W_f)}{W_i} \times 100\%$$

$W_i$=initial coat weight (before solvent introduction)
$W_f$=final coat weight (after solvent evaporation)

Reference Example 8—ROR Evaluations

The rub off resistance (ROR %) test (sometimes referred to as anchorage index) measures the amount of cured silicone left after the coated substrate has been subjected to surface abrasion. It indicates how strong the cured coating film is anchored to the substrate; the higher the ROR % value the better. The ROR % was measured as soon as the coated substrate exited the curing oven. From each coated substrate, 2 sample discs were prepared and the silicone present in each sample disc of the coated substrate was then determined via an Oxford Instruments Lab-X 3500 Benchtop XRF analyzer. Each sample disc of the coated substrate was then subjected to an abrasion test under a load of 1.9 kg and in contact with a felt using automated abrading equipment, in a manner similar to a 'Taber-type method'. The ROR % was calculated as follows: ROR %=$(W_f/W_i)\times100$, where $W_i$=initial coat weight (before abrasion), and $W_f$=final coat weight (after abrasion). The room temperature aged ROR % was tested via: a. Putting liner under 40 lbs weight in constant humidity (50% RH) and RT for certain time. b. Test anchorage (ROR %) by employing the method above.

TABLE 5

Extractable %, ROR % and 1 week room temperature aged ROR %.

| | Sample number | Extractable % | ROR % | 1 week room temperature aged ROR [%] |
|---|---|---|---|---|
| Additive of Example 4 | F1 (W) | 2.80 | 9.86 | 8.66 |
| 7028 | F2 (C) | 19.22 | 77.01 | 90.81 |
| Additive of Ex. 4/7028 = 1/1 (weight ratio) | F3 (W) | 6.31 | 93.76 | 98.96 |

The additive prepared in Example 4 afforded fast cure to a release coating composition as compared with the commercially available 7028 crosslinker. The blend of the additive prepared in Example 4 with 7028 improved the reactivity the release coating composition prepared therewith, the anchorage of a release coating prepared by curing said release coating composition, and the aged anchorage of said release coating. This was consistent with the DSC test results, above.

Reference Example 9—GPC

The following experimental procedure was used where the sample contained methyl groups. Samples were prepared as follows.
Sample Prep: 10 mg/mL in eluent; solvated one hour with occasional shaking; samples filtered through 0.45 µm PTFE syringe filters prior to injection
Pump: Waters 515 at a nominal flow rate of 1.0 mL/min
Eluent: HPLC grade toluene
Injector: Waters 717, 100 µL injection
Columns: Two (300 mm×7.5 mm) Polymer Laboratories PLgel 5 µm Mixed-C columns,
preceded by a PLgel 5 µm guard column (50 mm×7.5 mm), 45° C.
Detection: Waters 2410 differential refractive index detector, 45° C.
Data system: Atlas 8.3, Cirrus 2.0
Calibration: Relative to 14 narrow polystyrene standards covering the range of 580 g/mole to 2,300,000 g/mole, fit to a 3rd order polynomial curve
The following experimental procedure was used where the sample contained phenyl groups.
Sample Prep: 10 mg/mL in eluent; solvated one hour; solutions filtered through 0.45 µm PTFE syringe filter prior to injection
Pump: Waters 2695 at a nominal flow rate of 1.0 mL/min
Eluent: Certified grade THF
Injector: Waters 2695, 100 µL injection
Columns: Two (300 mm×7.5 mm) Polymer Laboratories PLgel 5 µm Mixed-C columns,
preceded by a PLgel 5 µm guard column (50 mm×7.5 mm), 35° C.
Detection: Waters 2410 differential refractive index detector, 35° C.
Data system: Atlas 8.3, Cirrus 2.0
Calibration: Relative to 16 narrow polystyrene standards covering the range of 580 g/mole to 2,300,000 g/mole, fit to a 3rd order polynomial curve.

Definitions and Usage of Terms

Abbreviations used in the specification have the definitions in Table 6, below.

TABLE 6

Abbreviations

| Abbreviation | Definition |
|---|---|
| cP | centiPose |
| d | day |
| Da | Daltons |
| DP | degree of polymerization |
| FTIR | Fourier Transfer Infra-Red |
| g | grams |
| GC | gas chromatography |
| GPC | gel permeation chromatography |
| HPLC | high performance liquid chromatography |
| Me | methyl |
| mg | milligrams |
| MHz | megaHertz |

TABLE 6-continued

Abbreviations

| Abbreviation | Definition |
| --- | --- |
| mL | milliliters |
| mm | millimeters |
| Mn | number average molecular weight as measured by GPC as described in Reference Example 9 |
| mPa·s | milli-Pascal seconds |
| MS | mass spectroscopy |
| Mw | weight average molecular weight |
| NMR | nuclear magnetic resonance |
| O.D. | outer diameter |
| PD | polydispersity |
| Ph | phenyl |
| ppm | parts per million |
| PTFE | polytetrafluoroethylene |
| RH | relative humidity |
| RT | room temperature of 25° C. |
| s | seconds |
| SiH content | hydrogen, as silicon bonded hydrogen, as measured by 29 Si NMR as described in Reference Example 3 |
| THF | tetrahydrofuran |
| μL | microliter |
| μm | micrometer |
| Vi | vinyl |

All amounts, ratios, and percentages are by weight unless otherwise indicated. The amounts of all starting materials in a composition total 100% by weight. The SUMMARY and ABSTRACT are hereby incorporated by reference. The articles 'a', 'an', and 'the' each refer to one or more, unless otherwise indicated by the context of specification. The singular includes the plural unless otherwise indicated. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, or an aryl group, includes the member alkyl individually; the subgroup alkyl and aryl; and any other individual member and subgroup subsumed therein.

"Alkyl" means a branched or unbranched, saturated monovalent hydrocarbon group. Examples of alkyl groups include methyl, ethyl, propyl (including n-propyl and/or iso-propyl), butyl (including iso-butyl, n-butyl, tert-butyl, and/or sec-butyl), pentyl (including, iso-pentyl, neopentyl, and/or tert-pentyl); and n-hexyl, n-heptyl, n-octyl, n-nonyl, and n-decyl, as well as branched saturated monovalent hydrocarbon groups of 6 or more carbon atoms. Alkyl groups have at least one carbon atom. Alternatively, alkyl groups may have 1 to 18 carbon atoms, alternatively 1 to 12 carbon atoms, alternatively 1 to 6 carbon atoms, alternatively 1 to 4 carbon atoms, alternatively 1 to 2 carbon atoms, and alternatively 1 carbon atom.

"Aralkyl" and "alkaryl" each refer to an alkyl group having a pendant and/or terminal aryl group or an aryl group having a pendant alkyl group. Exemplary aralkyl groups include benzyl, tolyl, xylyl, dimethyl phenyl, phenylmethyl, phenylethyl, phenyl propyl, and phenyl butyl. Aralkyl groups have at least 7 carbon atoms. Monocyclic aralkyl groups may have 7 to 12 carbon atoms, alternatively 7 to 9 carbon atoms, and alternatively 7 to 8 carbon atoms. Polycyclic aralkyl groups may have 7 to 17 carbon atoms, alternatively 7 to 14 carbon atoms, and alternatively 9 to 10 carbon atoms.

"Alkenyl" means a branched, or unbranched monovalent hydrocarbon group, where the monovalent hydrocarbon group has a double bond. Alkenyl groups include vinyl, allyl, and hexenyl. Alkenyl groups have at least 2 carbon atoms. Alternatively, alkenyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Alkynyl" means a branched, or unbranched monovalent hydrocarbon group, where the monovalent hydrocarbon group has a triple bond. Alkynyl groups include ethynyl and propynyl. Alkynyl groups have at least 2 carbon atoms. Alternatively, alkynyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Aryl" means a hydrocarbon group derived from an arene by removal of a hydrogen atom from a ring carbon atom. Aryl is exemplified by, but not limited to, phenyl and naphthyl. Aryl groups have at least 5 carbon atoms. Monocyclic aryl groups may have 5 to 9 carbon atoms, alternatively 6 to 7 carbon atoms, and alternatively 6 carbon atoms. Polycyclic aryl groups may have 10 to 17 carbon atoms, alternatively 10 to 14 carbon atoms, and alternatively 12 to 14 carbon atoms.

"Carbocycle" and "carbocyclic" refer to a hydrocarbon ring. Carbocycles may be monocyclic or polycyclic, e.g., bicyclic or with more than two rings. Bicyclic carbocycles may be fused, bridged, or spiro polycyclic rings. Carbocycles have at least 3 carbon atoms. Monocyclic carbocycles may have 3 to 9 carbon atoms, alternatively 4 to 7 carbon atoms, and alternatively 5 to 6 carbon atoms. Polycyclic carbocycles may have 7 to 17 carbon atoms, alternatively 7 to 14 carbon atoms, and alternatively 9 to 10 carbon atoms. Carbocycles may be saturated (e.g., cyclopentane or cyclohexane), partially unsaturated (e.g., cyclopentene or cyclohexene), or fully unsaturated (e.g., cyclopentadiene or cycloheptatriene).

"Cycloalkyl" refers to a saturated hydrocarbon group including a carbocycle. Cycloalkyl groups are exemplified by cyclobutyl, cyclopentyl, cyclohexyl, and methylcyclohexyl. Cycloalkyl groups have at least 3 carbon atoms. Monocyclic cycloalkyl groups may have 3 to 9 carbon atoms, alternatively 4 to 7 carbon atoms, and alternatively 5 to 6 carbon atoms. Polycyclic cycloalkyl groups may have 7 to 17 carbon atoms, alternatively 7 to 14 carbon atoms, and alternatively 9 to 10 carbon atoms.

"Monovalent hydrocarbon group" means a univalent group made up of hydrogen and carbon atoms. Monovalent hydrocarbon groups include alkyl, aralkyl, alkenyl, alkynyl, and cycloalkyl groups as defined above.

"Monovalent halogenated hydrocarbon group" means a monovalent hydrocarbon group where one or more hydrogen atoms bonded to a carbon atom have been formally replaced with a halogen atom. Halogenated hydrocarbon groups include haloalkyl groups, halogenated carbocyclic groups, and haloalkenyl groups. Halogenated alkyl groups (or haloalkyl groups) include the alkyl groups or cycloalkyl groups described above where one or more of the hydrogen atoms is replaced with a halogen atom, such as F or Cl. Haloalkyl groups include fluorinated alkyl groups and fluorinated cycloalkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl; and chlorinated alkyl and chlorinated cycloalkyl groups such as chloromethyl, 3-chloropropyl 2,2-dichlorocyclopropyl, 2,3-dichlorocyclopentyl. Haloalkenyl groups include chloroallyl. Halogenated aryl groups include chlorobenzyl and fluorobenzyl.

The term "comprising" and derivatives thereof, such as "comprise" and "comprises" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

Suppliers of commercially available starting materials include the following. Dow Silicones Corporation means Dow Silicones Corporation of Midland, Mich., US. Gelest means Gelest, Inc. of Morrisville, Pa., USA. Millipore Sigma is (Sigma-Aldrich) of St. Louis, Mo., USA.

Generally, as used herein a hyphen "-" or dash "–" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims.

Release Coating Embodiments of the Invention

In a first embodiment, a release coating composition comprises:
(i) polyfunctional organohydrogensiloxane of formula:

where each $R^E$ is a group of formula:

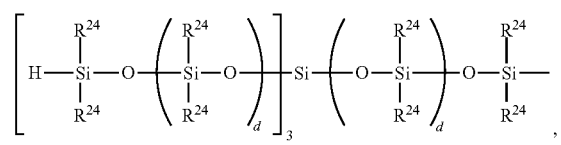

where
each subscript x is independently 1, 2, or 3,
each subscript x' is independently 1, 2, or 3,
a quantity (x+x')=2 to 6,
each subscript w is independently 1 to 10,
each subscript n is 1 to 2,000,
each subscript d is independently 0 to 995,
each R is an independently selected monovalent hydrocarbon group,
each $R^1$ is independently selected from the group consisting of monovalent hydrocarbon groups and monovalent halogenated hydrocarbon groups,
each $R^2$ is an independently selected alkyl group of 1 to 6 carbon atoms,
each $R^3$ is independently selected from the group consisting of monovalent hydrocarbon groups and monovalent halogenated hydrocarbon groups,
each $R^D$ is a divalent hydrocarbon group,
each $R^{D1}$ is independently selected from the group consisting of an oxygen atom and a divalent hydrocarbon group, and
each $R^{24}$ an independently selected monovalent hydrocarbon group;
(ii) a polyorganosiloxane having an average, per molecule, of at least two silicon bonded aliphatically unsaturated groups capable of undergoing hydrosilylation reaction,
(iii) a hydrosilylation reaction catalyst, and
(iv) a hydrosilylation reaction inhibitor.

In a second embodiment of the release coating composition of the first embodiment, each subscript d=0 and the polyfunctional organohydrogensiloxane has formula:

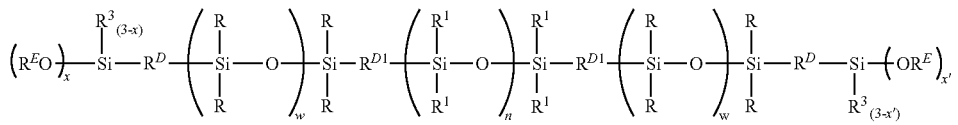

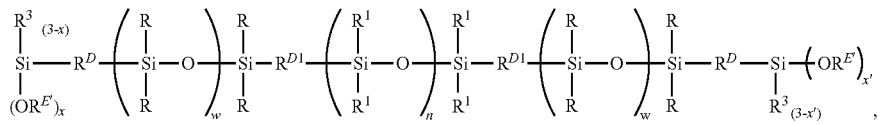

where each $R^{E'}$ is a group of formula

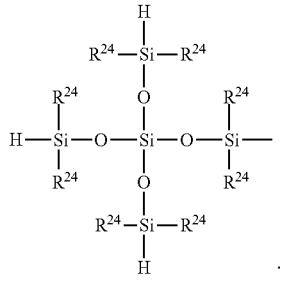

In a third embodiment, the release coating composition of the first embodiment or the second embodiment further comprises one or more additional starting materials selected from the group consisting of: (v) an anchorage additive, (vi) an anti-mist additive, (vii) a controlled release agent, (viii) a linear polyorganohydrogensiloxane, and (ix) a solvent.

In a fourth embodiment, in the release coating composition of any one of the first to third embodiments, starting material (ii) comprises a polyorganosiloxane of unit formula: $(R^{10}R^9{}_2SiO_{1/2})_{aa}(R^{10}R^9SiO_{2/2})_{bb}(R^{10}{}_2SiO_{2/2})_{cc}(R^9{}_3SiO_{1/2})_{dd}$, where each $R^9$ is an independently selected monovalent hydrocarbon group that is free of aliphatic unsaturation or a monovalent halogenated hydrocarbon group that is free of aliphatic unsaturation; each $R^{10}$ is independently selected from the group consisting of alkenyl and alkynyl; subscript aa is 0, 1, or 2, subscript bb is 0 or more, subscript cc is 1 or more, subscript dd is 0, 1, or 2, with the provisos that a quantity (aa+bb)≥2, and (aa+dd)=2, with the proviso that a quantity (aa+bb+cc+dd) is 3 to 2,000.

In a fifth embodiment, in the release coating composition of the fourth embodiment, starting material (ii) comprises a substantially linear, alternatively linear, polyorganosiloxane selected from the group consisting of:
i) dimethylvinylsiloxy-terminated polydimethylsiloxane,
ii) dimethylvinylsiloxy-terminated poly(dimethylsiloxane/methylvinylsiloxane),
iii) dimethylvinylsiloxy-terminated polymethylvinylsiloxane,
iv) trimethylsiloxy-terminated poly(dimethylsiloxane/methylvinylsiloxane),
v) trimethylsiloxy-terminated polymethylvinylsiloxane,
vi) dimethylvinylsiloxy-terminated poly(dimethylsiloxane/methylvinylsiloxane),
vii) dimethylvinylsiloxy-terminated poly(dimethylsiloxane/methylphenylsiloxane),
viii) dimethylvinylsiloxy-terminated poly(dimethylsiloxane/diphenylsiloxane),
ix) phenyl,methyl,vinyl-siloxy-terminated polydimethylsiloxane,
x) dimethylhexenylsiloxy-terminated polydimethylsiloxane,
xi) dimethylhexenylsiloxy-terminated poly(dimethylsiloxane/methylhexenylsiloxane),
xii) dimethylhexenylsiloxy-terminated polymethylhexenylsiloxane,
xiii) trimethylsiloxy-terminated poly(dimethylsiloxane/methylhexenylsiloxane),
xiv) trimethylsiloxy-terminated polymethylhexenylsiloxane
xv) dimethylhexenyl-siloxy terminated poly(dimethylsiloxane/methylhexenylsiloxane),
xvi) dimethylvinylsiloxy-terminated poly(dimethylsiloxane/methylhexenylsiloxane), and
xvii) a combination thereof.

In a sixth embodiment, in the release coating composition of any one of the first to fifth embodiments, starting material (ii) comprises a branched siloxane of formula:

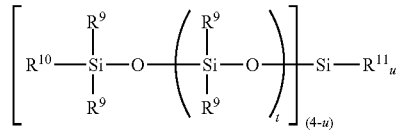

where subscript u is 0 or 1, each subscript t is independently 0 to 995, alternatively 15 to 995, each $R^{11}$ is an independently selected monovalent hydrocarbon group, each $R^9$ is an independently selected monovalent hydrocarbon group that is free of aliphatic unsaturation or a monovalent halogenated hydrocarbon group that is free of aliphatic unsaturation as described above, and each $R^{10}$ is independently selected from the group consisting of alkenyl and alkynyl as described above.

In a seventh embodiment, in the release coating composition of any one of the first to sixth embodiments, the hydrosilylation reaction catalyst is selected from the group consisting of Karstedt's catalyst and Ashby's catalyst.

In an eighth embodiment, in the release coating composition of any one of the first to seventh embodiments, the hydrosilylation reaction inhibitor is selected from the group consisting of acetylenic alcohols (e.g., 1-ethynyl-1-cyclohexanol) and maleates (e.g., diallyl maleate, bis maleate, or n-propyl maleate), and a combination of two or more thereof.

In a ninth embodiment, the release coating composition of any one of the first to eighth embodiments further comprises an additional starting material selected from the group consisting of (v) an anchorage additive, (vi) an anti-mist additive, (vii) a release modifier, (viii) a substantially linear or linear polyorganohydrogensiloxane, and (ix) a solvent, and two or more of (v), (vi), (vii), (viii), and (ix).

In a tenth embodiment, in the release coating composition of the ninth embodiment the anchorage additive is present and comprises a polyorganosilicate resin.

In an eleventh embodiment, in the release coating composition of the ninth embodiment, the substantially linear or linear polyorganohydrogensiloxane is present and comprises unit formula: $(HR^{12}{}_2SiO_{1/2})_{v'}(HR^{12}SiO_{2/2})_{w'}(R^{12}{}_2SiO_{2/2})_{x'}(R^{12}{}_3SiO_{1/2})_{y'}$, where each $R^{12}$ is an independently selected monovalent hydrocarbon group, subscript v' is 0, 1, or 2, subscript w' is 1 or more, subscript x' is 0 or more, subscript y' is 0, 1, or 2, with the provisos that a quantity (v'+y')=2, and a quantity (v'+w') 3, and a quantity (v'+w'+x'+y') is 2 to 1,000.

In a twelfth embodiment, in the release coating composition of the eleventh embodiment, the polyorganohydrogensiloxane is selected from the group consisting of:
i) dimethylhydrogensiloxy-terminated poly(dimethyl/methylhydrogen)siloxane copolymer,
ii) dimethylhydrogensiloxy-terminated polymethylhydrogensiloxane,
iii) trimethylsiloxy-terminated poly(dimethyl/methylhydrogen)siloxane copolymer,
iv) trimethylsiloxy-terminated polymethylhydrogensiloxane, and
v) two or more of i) to iv).

Adhesive Composition Embodiments of the Invention

In a first embodiment, an adhesive composition comprises:
A) clustered functional organosiloxane of formula

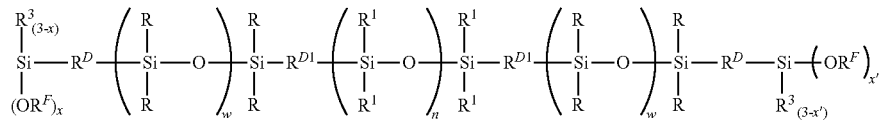

where each $R^F$ is a group of formula:

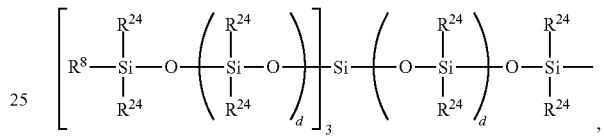

where
each subscript x is independently 1, 2, or 3,
each subscript x' is independently 1, 2, or 3,
a quantity (x+x')=2 to 6,
each subscript w is independently 1 to 10,
each subscript n is 1 to 2,000,
each subscript d is independently 0 to 995,
each R is an independently selected monovalent hydrocarbon group,
each $R^1$ is independently selected from the group consisting of monovalent hydrocarbon groups and monovalent halogenated hydrocarbon groups,
each $R^2$ is an independently selected alkyl group of 1 to 6 carbon atoms,
each $R^3$ is independently selected from the group consisting of monovalent hydrocarbon groups and monovalent halogenated hydrocarbon groups,
each $R^D$ is a divalent hydrocarbon group,
each $R^{D1}$ is independently selected from the group consisting of an oxygen atom and a divalent hydrocarbon group, and
each $R^{24}$ is an independently selected monovalent hydrocarbon group, and
each $R^8$ is independently selected from the group consisting of H and a curable group;
B) a reactive resin and polymer;
C) a condensation reaction catalyst; and
D) a free radical initiator.

In a second embodiment, in the adhesive composition of the first embodiment, each subscript d=0, and the clustered functional organosiloxane has formula:

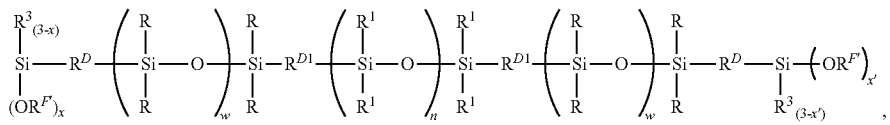

where each $R^F$, is a group of formula

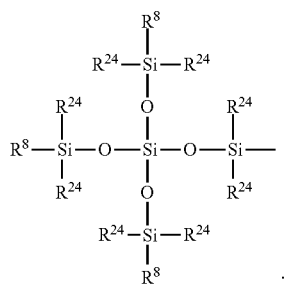

In a third embodiment, in the adhesive composition of the first embodiment or the second embodiment, starting material B) is a poly-alkoxy endblocked resin-polymer blend comprising a reaction product of i) a siloxane resin comprising units of formulae $(R^{2'}_3SiO_{1/2})$ and $(SiO_{4/2})$, where each $R^{2'}$ is independently a monovalent hydrocarbon group, with the proviso that at least one $R^{2'}$ per molecule has aliphatic unsaturation, wherein the siloxane resin has a molar ratio of $(R^{2'}_3SiO_{1/2})$ units (M units) to $(SiO_{4/2})$ units (Q units) ranging from 0.5:1 to 1.5:1 (M:Q ratio), ii) a polydiorganosiloxane comprising units of formulae $(R^{2'}_3SiO_{1/2})_{ii}$ and $(R^2SiO_{2/2})_{hh}$ (D units), where subscript hh is 20 to 1000 and subscript ii has an average value of 2, and iii) an alkoxy-functional organohydrogensiloxane oligomer. The alkoxy-functional organohydrogensiloxane oligomer has unit formula

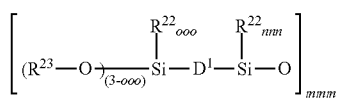

$(HR^{22}_2SiO_{1/2})_{ppp}(R^{22}_3SiO_{1/2})_{qqq}(HR^{22}SiO_{2/2})_{rrr}$ $(R^{22}_2SiO_{2/2})_{sss}(R^{22}SiO_{3/2})_{ttt}(HSiO_{3/2})_{uuu}(SiO_{4/2})_{kk}$, where each $D^1$ independently represents a divalent hydrocarbon group of 2 to 18 carbon atoms; each $R^{22}$ independently represents a monovalent hydrocarbon group of 1 to 18 carbon atoms or a monovalent halogenated hydrocarbon group of 1 to 18 carbon atoms, each $R^{23}$ is independently a monovalent hydrocarbon group of 1 to 18 carbon atoms, subscript nnn is 0 or 1, subscript ooo is 0, subscripts qqq, sss, and ttt have values such that 5≥qqq≥0, 5≥sss≥0, subscript ttt is 0 or 1, subscript kk is 0 or 1, subscript nnn>0, and a quantity (mmm+ppp+qqq+rrr+sss+ttt+uuu+kk) 50; and iv) a hydrosilylation reaction catalyst.

In a fourth embodiment, in any one of the first to third embodiments of the adhesive composition, starting material C) is selected from the group consisting of: a) stannic salts of carboxylic acids, b) tin (II) salts of organic carboxylic acids, c) stannous salts of carboxylic acids d) organotitanium compounds, and e) combinations of two or more of a), b), c), and d) organotitanium compounds.

In a fifth embodiment, in the adhesive composition of any one of the first to fourth embodiments, starting material D) is selected from the group consisting of azo compounds and organic peroxide compounds.

In a sixth embodiment, the adhesive composition of any one of the first to fifth embodiments further comprises an additional starting material distinct from and added in addition to starting materials A), B), C) and D) described above, wherein the additional starting material is selected from the group consisting of E) a dual cure compound, F) an adhesion promoter, G) a corrosion inhibitor, H) a rheology modifier, I) a drying agent, J) a crosslinker, K) a filler, L) a spacer, M) an acid scavenger, N) a silanol functional polydiorganosiloxane, O) a fluorescent optical brightener, P) a chain transfer agent, Q) a (meth)acrylate monomer, R) a polyalkoxy terminated polydiorganosiloxane, S) a colorant, and two or more of E), F), G), H), I), J), K), L), M), N), O), P), Q), R), and S).

In a seventh embodiment, the adhesive composition of the sixth embodiment comprises the E) dual cure compound, and the dual cure compound is selected from the group consisting of methacryloxypropyltrimethoxysilane, acryloxypropyltrimethoxysilane, acryloxypropyltriethoxysilane, methacryloxypropyltriethoxysilane, methacryloxypropylmethyldimethoxysilane, acryloxypropylmethyldimethoxysilane, acryloxypropyldimethylmethoxysilane, methacryloxypropyldimethylmethoxysilane, and a combination of two or more thereof.

In an eighth embodiment, the adhesive composition of the sixth embodiment or the seventh embodiment comprises the F) adhesion promoter, and the adhesion promoter is selected from the group consisting of beta-(3,4-epoxycyclohexyl)ethyltrimethoxysilane, 3-am inopropyltrimethoxysilane, triallylisocyanurate, trimethoxysilyl terminated polydimethylsiloxane, and a combination of two or more thereof.

In a ninth embodiment, the adhesive composition of any one of the sixth to eighth embodiments comprises the G) corrosion inhibitor, and the corrosion inhibitor is selected from the group consisting of 2-mercaptobenzothiazole, 2,5-dimercapto-1,3,4-thiadiazole, mercaptabenzotriazole, alkylthiadiazole and a combination of two or more thereof.

In a tenth embodiment, the adhesive composition of any one of the sixth to ninth embodiments comprises an alkoxysilane.

In an eleventh embodiment, in the adhesive composition of the tenth embodiment, the alkoxysilane is selected from the group consisting of vinyltrimethoxysilane, vinyltriethoxysilane, methyltrimethoxysilane, isobutyltrimethoxysilane, and a combination of two or more thereof.

In a twelfth embodiment, the adhesive composition of any one of the sixth to eleventh embodiments comprises the K) filler, and the filler comprises fume silica.

In a thirteenth embodiment, the adhesive composition of any one of the sixth to twelfth embodiments comprises the L) spacer, and the spacer comprises glass beads.

The invention claimed is:

1. A method for preparing a product comprising:
1) combining
   A) a boron containing Lewis acid,
   B) an alkoxysilyl terminated polydiorganosiloxane of formula:

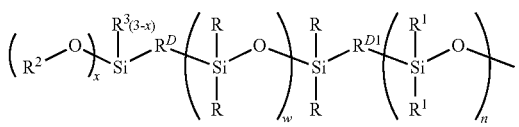

-continued

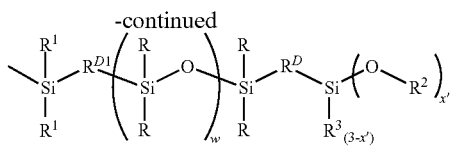

where each subscript x is independently 1, 2, or 3;
each subscript x' is independently 1, 2, or 3;
a quantity (x+x')=2 to 6;
each subscript w is independently 1 to 10;
each subscript n is 1 to 2,000;
each R is an independently selected monovalent hydrocarbon group;
each $R^1$ is independently selected from the group consisting of monovalent hydrocarbon groups and monovalent halogenated hydrocarbon groups;
each $R^2$ is an independently selected alkyl group of 1 to 6 carbon atoms;
each $R^3$ is independently selected from the group consisting of monovalent hydrocarbon groups and monovalent halogenated hydrocarbon groups;
each $R^D$ is a divalent hydrocarbon group;
each $R^{D1}$ is independently selected from the group consisting of an oxygen atom and a divalent hydrocarbon group; and
C) a branched organohydrogensiloxane of formula:

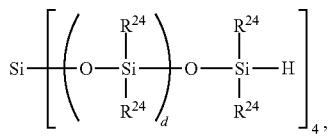

where each subscript d is independently 0 to 995 and each $R^{24}$ is an independently selected monovalent hydrocarbon group; thereby preparing the product, where the product comprises a polyfunctional organohydrogensiloxane and a by-product comprising $HR^2$, and
combining starting materials comprising
 a) the polyfunctional organohydrogensiloxane,
 b) a hydrosilylation reaction catalyst, and
 c) a reactive species having an average, per molecule at least one aliphatically unsaturated group capable of undergoing an addition reaction with a silicon bonded hydrogen atom of starting material b) and further comprising one or more curable groups per molecule, thereby preparing a clustered functional organosiloxane.

2. The method of claim 1, where the method is performed at a temperature of 5° C. to 70° C.

3. The method of claim 1, where the where A) the boron containing Lewis acid is a trivalent boron compound with at least one perfluoroaryl group per molecule.

4. The method of claim 3, where the boron containing Lewis acid is $B(C_6F_5)_3$, tris(pentafluorophenyl)borane.

5. The method of claim 1, where subscript n is 1 to 1,000, each R is an independently selected alkyl group of 1 to 6 carbon atoms, and each $R^1$ is independently selected from the group consisting of an alkyl group of 1 to 20 carbon atoms, an alkenyl group of 2 to 20 carbon atoms, an aryl group of 6 to 20 carbon atoms, and a halogenated alkyl group of 1 to 20 carbon atoms.

6. The method of claim 1, where each subscript d=0, and C) the branched organohydrogensiloxane has formula:

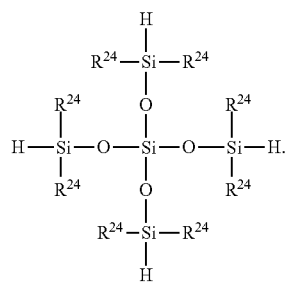

7. The method of claim 6, where each $R^{24}$ is an alkyl group of 1 to 6 carbon atoms.

8. The method of claim 1, where step 1) comprises:
 1a) combining starting materials comprising
  A) the boron containing Lewis acid, and
  B) the alkoxysilyl terminated polydiorganosiloxane, thereby forming a catalyzed mixture; and thereafter
 1b) adding the catalyzed mixture into a starting material comprising
  C) the branched organohydrogensiloxane.

9. The method of claim 8, further comprising: adding additional boron containing Lewis acid, to C) the organohydrogensiloxane before adding the catalyzed mixture into the starting material comprising the organohydrogensiloxane in step 1 b).

10. The method of claim 9, where the additional boron containing Lewis acid is present in an amount of 5 ppm to 250 ppm based on weight of C) the organohydrogensiloxane.

11. The method of claim 8, where step 1b) is performed at a temperature of 5° C. to 40° C.

12. The method of claim 1, where the boron containing Lewis acid, and when present, and any additional boron containing Lewis acid, is provided in a total amount of 50 ppm to 6000 ppm, based on combined weights of B) the organosilicon compound and C) the organohydrogensiloxane.

13. The method of claim 1, further comprising: 2) during and/or after step 1), removing the $HR^2$ generated during formation of the polyfunctional organohydrogensiloxane.

14. The method of claim 1, further comprising: neutralizing residual catalyst in the polyfunctional organohydrogensiloxane.

15. The method of claim 1, where the reactive species comprises a silane of formula $R^4_y SiR^5_{(4-y)}$, where subscript y is 1 to 3, each $R^4$ is the aliphatically unsaturated group capable of undergoing an addition reaction, and each $R^5$ is the curable group.

16. The method of claim 15, where subscript y=1; each $R^4$ is independently selected from the group consisting of alkenyl and alkynyl; and each $R^5$ is independently selected from the group consisting of acrylate groups, alcohol groups, alkoxy groups, epoxy groups, isocyanate groups, methacrylate groups, and urethane groups.

17. The method of claim 1, where the reactive species has formula $R^6 R^7$, where each $R^6$ is the aliphatically unsaturated group capable of undergoing an addition reaction, and each $R^7$ is the curable group.

18. The method of claim 17, where each $R^6$ is independently selected from the group consisting of alkenyl and alkynyl; and each $R^7$ is independently selected from the group consisting of acrylate groups, alcohol groups, alkoxy groups, epoxy groups, isocyanate groups, methacrylate groups, and urethane groups.

19. A clustered functional organosiloxane of formula:

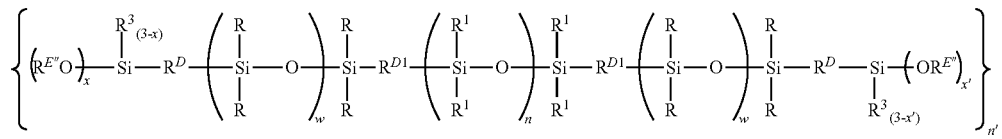

where each $R^{F''}$ is a group of formula

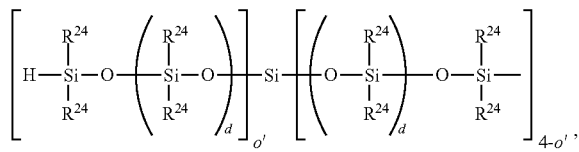

where
each subscript x is independently 1, 2, or 3,
each subscript x' is independently 1, 2, or 3,
a quantity (x+x')=2 to 6,
each subscript w is independently 1 to 10,
each subscript n is 1 to 2,000,
subscript n' is 1 to 101,
each subscript d is independently 0 to 995,
each subscript o' is independently 0 to 3,
each R is an independently selected monovalent hydrocarbon group,
each $R^1$ is independently selected from the group consisting of monovalent hydrocarbon groups and monovalent halogenated hydrocarbon groups,
each $R^2$ is an independently selected alkyl group of 1 to 6 carbon atoms,
each $R^3$ is independently selected from the group consisting of monovalent hydrocarbon groups and monovalent halogenated hydrocarbon groups,
each $R^D$ is a divalent hydrocarbon group,
each $R^{D1}$ is independently selected from the group consisting of an oxygen atom and a divalent hydrocarbon group,
each $R^{24}$ is an independently selected monovalent hydrocarbon group, and
each $R^8$ is independently selected from the group consisting of H and a curable group, with the proviso that at least one $R^8$, per molecule, is a curable group.

20. The clustered functional organosiloxane of claim 19, where subscript n'=1 and the clustered functional organosiloxane has formula:

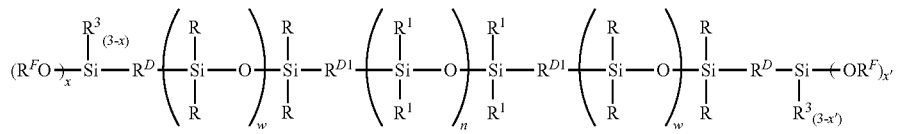

where each $R^F$ is a group of formula

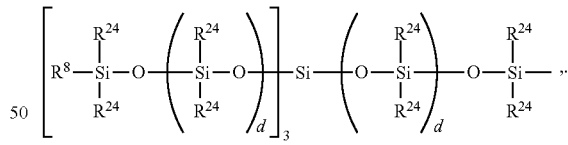

21. The clustered functional organosiloxane of claim 20, where each subscript d=0, and the clustered functional organosiloxane has formula:

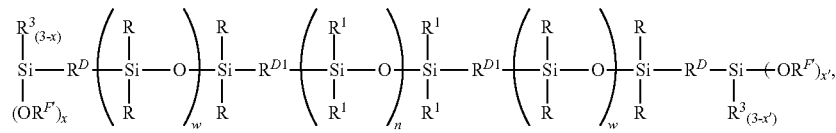

where each $R^{F'}$ is a group of formula

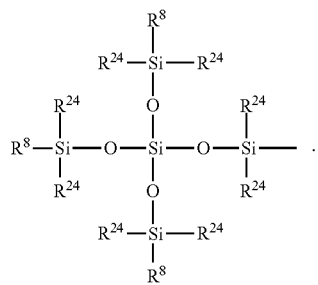

22. An adhesive composition comprising:
A) clustered functional organosiloxane of formula

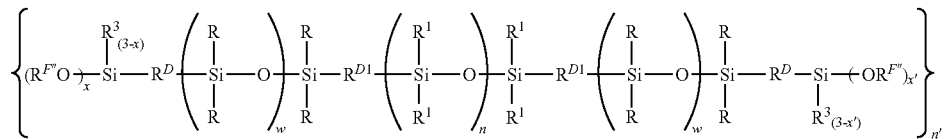

where each $R^{F''}$ is a group of formula

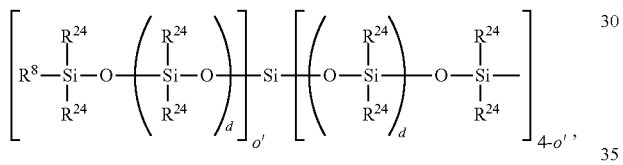

where
each subscript x is independently 1, 2, or 3,
each subscript x' is independently 1, 2, or 3,
a quantity (x+x')=2 to 6,
each subscript w is independently 1 to 10,
each subscript n is 1 to 2,000,
subscript n' is 1 to 101,
each subscript d is independently 0 to 995,
each subscript o' is independently 0 to 3,
each R is an independently selected monovalent hydrocarbon group,
each $R^1$ is independently selected from the group consisting of monovalent hydrocarbon groups and monovalent halogenated hydrocarbon groups,
each $R^2$ is an independently selected alkyl group of 1 to 6 carbon atoms,
each $R^3$ is independently selected from the group consisting of monovalent hydrocarbon groups and monovalent halogenated hydrocarbon groups, each $R^D$ is a divalent hydrocarbon group,
each $R^{D1}$ is independently selected from the group consisting of an oxygen atom and a divalent hydrocarbon group,
each $R^{24}$ is an independently selected monovalent hydrocarbon group, and each $R^8$ is independently selected from the group consisting of H and a curable group, with the proviso that at least one $R^8$, per molecule, is a curable group;
B) a reactive resin and polymer;
C) a condensation reaction catalyst; and
D) a free radical initiator; and
optionally, an additional starting material, where the additional starting material is selected from the group consisting of E) a dual cure compound, F) an adhesion promoter, G) a corrosion inhibitor, H) a rheology modifier, I) a drying agent, J) a crosslinker, K) a filler, L) a spacer, M) an acid scavenger, N) a silanol functional polydiorganosiloxane, O) a fluorescent optical brightener, P) a chain transfer agent, Q) a (meth)acrylate monomer, R) a poly-alkoxy terminated polydiorganosiloxane, S) a colorant, and two or more of E), F), G), H), I), J), K), L), M), N), O), P), Q), R), and S).

23. The method of claim 1, where the polyfunctional organohydrogensiloxane has formula:

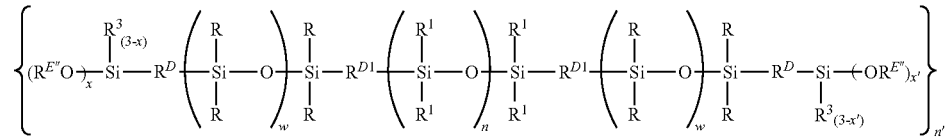

where each subscript x is independently 1, 2, or 3,
each subscript x' is independently 1, 2, or 3,
a quantity (x+x')=2 to 6,
each subscript w is independently 1 to 10,
each subscript n is 1 to 2,000,
subscript n' is 1 to 101,
each R is an independently selected monovalent hydrocarbon group,
each $R^1$ is independently selected from the group consisting of monovalent hydrocarbon groups and monovalent halogenated hydrocarbon groups,
each $R^2$ is an independently selected alkyl group of 1 to 6 carbon atoms,
each $R^3$ is independently selected from the group consisting of monovalent hydrocarbon groups and monovalent halogenated hydrocarbon groups,
each $R^D$ is a divalent hydrocarbon group,
each $R^{D1}$ is independently selected from the group consisting of an oxygen atom and a divalent hydrocarbon group, and each $R^{E''}$ has formula:

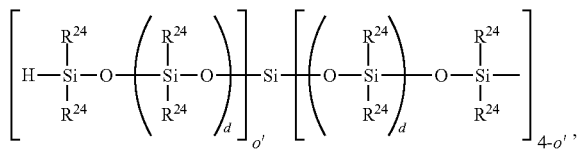

where each $R^{24}$ is an independently selected monovalent hydrocarbon group, subscript o'=0 to 3, and each subscript d is independently 0 to 995.

24. The method of claim 23, where in the polyfunctional organohydrogensiloxane subscript n'=1 and the polyfunctional organohydrogensiloxane has formula:

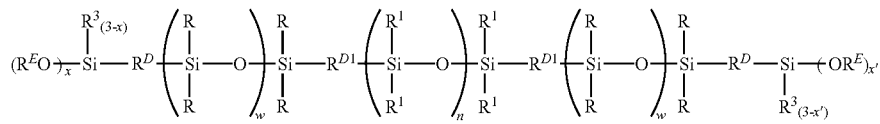

where each $R^E$ is a group of formula:

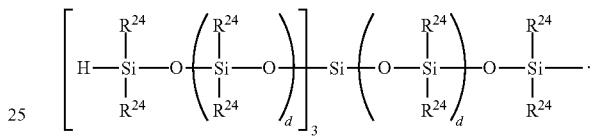

25. The method of claim 24, where in the polyfunctional organohydrogensiloxane each subscript d=0, and the polyfunctional organohydrogensiloxane has formula:

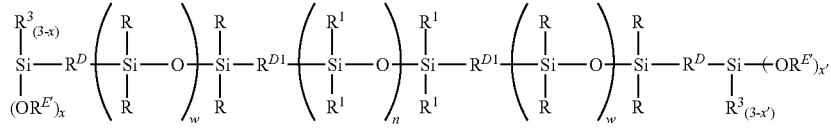

where each $R^{E'}$ is a group of formula

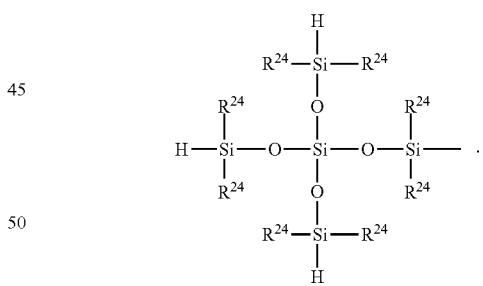

* * * * *

UNITED STATES PATENT AND TRADEMARK OFFICE
CERTIFICATE OF CORRECTION

PATENT NO. : 11,643,506 B2  Page 1 of 1
APPLICATION NO. : 17/277593
DATED : May 9, 2023
INVENTOR(S) : Lu et al.

It is certified that error appears in the above-identified patent and that said Letters Patent is hereby corrected as shown below:

In the Claims

In Claim 19, at Column 59-60, in the first chemical formula shown, replace both instances of $R^{E''}$ with $R^{F''}$ as shown in the corrected formula below:

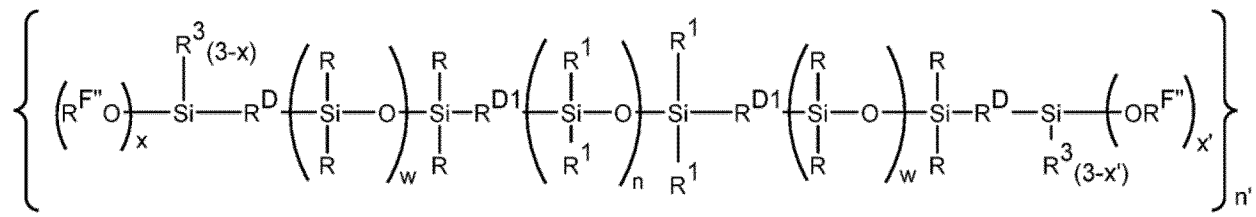

Signed and Sealed this
First Day of October, 2024

Katherine Kelly Vidal
*Director of the United States Patent and Trademark Office*